(12) United States Patent
Pakzad et al.

(10) Patent No.: US 9,983,224 B2
(45) Date of Patent: May 29, 2018

(54) MOTION DIRECTION DETERMINATION AND APPLICATION

(71) Applicant: QUALCOMM Incorporated, San Diego, CA (US)

(72) Inventors: Payam Pakzad, Mountain View, CA (US); Victor Kulik, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 927 days.

(21) Appl. No.: 14/268,962

(22) Filed: May 2, 2014

(65) Prior Publication Data

US 2015/0316578 A1  Nov. 5, 2015

(51) Int. Cl.
*G01P 15/00* (2006.01)
*G01B 7/00* (2006.01)
(Continued)

(52) U.S. Cl.
CPC .............. *G01P 15/00* (2013.01); *G01B 7/00* (2013.01); *G01C 21/165* (2013.01);
(Continued)

(58) Field of Classification Search
CPC ............ G01S 19/49; G01S 5/02; G01C 21/10
See application file for complete search history.

(56) References Cited

U.S. PATENT DOCUMENTS

| 7,907,838 B2 | 3/2011 | Nasiri et al. |
| 2009/0221298 A1 | 9/2009 | Hanner |

(Continued)

FOREIGN PATENT DOCUMENTS

| EP | 2657647 A1 | 10/2013 |
| WO | 2014016841 A1 | 1/2014 |

(Continued)

OTHER PUBLICATIONS

Herrera E.P., et al., "Improving data fusion in personal positioning systems for outdoor environments," Information Fusion, vol. 14, 2013, pp. 45-56.

(Continued)

*Primary Examiner* — Paul D Lee
*Assistant Examiner* — Mark Crohn
(74) *Attorney, Agent, or Firm* — Weaver Austin Villeneuve & Sampson LLL-QUAL

(57) ABSTRACT

This disclosure provides devices, computer programs and methods for determining a motion direction. In one aspect, a mobile device includes sensors for measuring acceleration data. The mobile device also includes a processor and a memory that implement a motion direction estimation module configured to determine a primary axis of motion. The motion direction estimation module also determines a motion direction along the primary axis. The determination includes fitting the acceleration data, or data derived therefrom, to a bimodal distribution. A first peak of the bimodal distribution corresponds to a first motion direction along the primary axis, and a second peak corresponds to a second motion direction opposite the first. The motion direction estimation module is configured to estimate the motion direction based on the bimodal distribution. In some implementations, the motion direction estimation module selects the motion direction corresponding to the higher of the peaks as the estimated motion direction.

29 Claims, 12 Drawing Sheets

(51) Int. Cl.
*G01S 19/49* (2010.01)
*G01S 5/02* (2010.01)
*G01C 21/16* (2006.01)
*G01C 22/00* (2006.01)

(52) U.S. Cl.
CPC .......... *G01C 22/006* (2013.01); *G01S 5/0278* (2013.01); *G01S 5/0294* (2013.01); *G01S 19/49* (2013.01)

(56) References Cited

U.S. PATENT DOCUMENTS

| | | |
|---|---|---|
| 2009/0254294 A1 | 10/2009 | Dutta |
| 2010/0305856 A1 | 12/2010 | Park et al. |
| 2011/0010131 A1 | 1/2011 | Miyajima et al. |
| 2011/0054834 A1 | 3/2011 | Partridge et al. |
| 2011/0106418 A1* | 5/2011 | van der Merwe ..... G01C 21/12 701/532 |
| 2011/0125404 A1 | 5/2011 | Czompo |
| 2011/0239026 A1 | 9/2011 | Kulik |
| 2011/0250931 A1 | 10/2011 | Pande et al. |
| 2012/0059583 A1 | 3/2012 | Supino et al. |
| 2012/0123735 A1 | 5/2012 | Kimishima |
| 2012/0136573 A1 | 5/2012 | Janardhanan et al. |
| 2012/0158296 A1 | 6/2012 | Waters et al. |
| 2012/0265482 A1 | 10/2012 | Grokop et al. |
| 2012/0265716 A1 | 10/2012 | Hunzinger et al. |
| 2012/0296596 A1 | 11/2012 | Profitt |
| 2012/0296603 A1 | 11/2012 | Kulik et al. |
| 2013/0040653 A1 | 2/2013 | Czompo et al. |
| 2013/0046505 A1* | 2/2013 | Brunner ............... G01C 21/165 702/141 |
| 2013/0076523 A1 | 3/2013 | Kwan et al. |
| 2013/0253880 A1 | 9/2013 | Joseph et al. |
| 2013/0311133 A1 | 11/2013 | Kordari et al. |
| 2014/0088867 A1 | 3/2014 | Takaoka |
| 2014/0236482 A1 | 8/2014 | Dorum et al. |
| 2015/0050923 A1 | 2/2015 | Tu et al. |
| 2015/0304437 A1 | 10/2015 | Vaccari et al. |
| 2015/0316576 A1 | 11/2015 | Pakzad et al. |
| 2015/0316577 A1 | 11/2015 | Pakzad et al. |
| 2015/0316579 A1 | 11/2015 | Pakzad et al. |
| 2015/0365806 A1 | 12/2015 | Parviainen et al. |

FOREIGN PATENT DOCUMENTS

| | | |
|---|---|---|
| WO | 2014039552 A1 | 3/2014 |
| WO | 2015167693 A1 | 11/2015 |
| WO | 2015167694 A1 | 11/2015 |
| WO | 2015167695 A1 | 11/2015 |
| WO | 2015167696 A1 | 11/2015 |

OTHER PUBLICATIONS

Beauregard, Stephane, "A Helmet-Mounted Pedestrian Dead Reckoning System", TZI Technologie-Zentrum Informatik, IFAWC2006, Mar. 15-16, 11 pages.
Pinchin, James et al., The Use of High Sensitivity GPS for Initialisation of a Foot Mounted Inertial Navigation System, 2012 IEEE, pp. 998-1007.
Pricope, et al., "Performance analysis of a novel pedestrian dead-reckoning method", 2011 IEEE $22^{nd}$ International Symposium of Personal, Indoor and Mobile Radio Communications, pp. 1244-1248.
Walter, Oliver, et al., "Smartphone-Based Sensor Fusion for Improved Vehicular Navigation", Department of Communications Engineering, University of Paderborn, Germany, 6 pages.
U.S. Office Action dated Feb. 8, 2017, in U.S. Appl. No. 14/268,955.
U.S. Office Action dated Nov. 18, 2016, in U.S. Appl. No. 14/268,968, 20 pages.
U.S. Final Office Action dated May 4, 2017, in U.S. Appl. No. 14/268,968, 20 pages.
U.S. Office Action dated Mar. 8, 2017, in U.S. Appl. No. 14/268,973, 21 pages.
International Search Report and Written Opinion—PCT/US2015/021966—ISA/EPO—dated Jul. 7, 2015.
International Preliminary Report on Patentability PCT/US2015/022037—ISA/EPO—dated Aug. 3, 2016.
International Search Report and Written Opinion—PCT/US2015/022037—ISA/EPO—dated Jul. 27, 2015.
International Preliminary Report on Patentability PCT/US2015/022054—ISA/EPO—dated Nov. 17, 2016.
International Search Report and Written Opinion—PCT/US2015/022054—ISA/EPO—dated Jun. 18, 2015.
International Preliminary Report on Patentability PCT/US2015/022039—ISA/EPO—dated Oct. 4, 2016.
International Search Report and Written Opinion—PCT/US2015/022039—ISA/EPO—dated Jun. 10, 2015.
U.S. Final Office Action dated Jul. 24, 2017, in U.S. Appl. No. 14/268,955.
U.S. Notice of Allowance dated Jan. 12, 2018, in U.S. Appl. No. 14/268,955.
U.S. Office Action dated Jan. 8, 2018, in U.S. Appl. No. 14/268,968.
U.S. Final Office Action dated Sep. 20, 2017, in U.S. Appl. No. 14/268,973, 21 pages.
U.S. Notice of Allowance dated Jan. 16, 2018, in U.S. Appl. No. 14/268,973, 21 pages.

* cited by examiner

MOTION DIRECTION DETERMINATION AND APPLICATION

CROSS-REFERENCE TO RELATED APPLICATIONS

This disclosure is related to: U.S. patent application Ser. No. 14/268,955 titled MOTION DIRECTION DETERMINATION AND APPLICATION and filed on the same day as the present patent application; U.S. patent application Ser. No. 14/268,968 titled MOTION DIRECTION DETERMINATION AND APPLICATION and filed on the same day as the present patent application; and U.S. patent application Ser. No. 14/268,973 titled MOTION DIRECTION DETERMINATION AND APPLICATION and filed on the same day as the present patent application; all of which applications are incorporated by reference herein and for all purposes.

TECHNICAL FIELD

This disclosure relates generally to techniques for determining a direction of motion, and more particularly, to a mobile device capable of estimating a direction of motion based on input from one or more sensors.

DESCRIPTION OF THE RELATED TECHNOLOGY

A variety of existing and anticipated applications for mobile electronic devices utilize knowledge of the mobile device's position, orientation, or motion direction. For example, in situations in which a person who is carrying a mobile device is walking or otherwise moving about, it can be useful for the mobile device to have the capability to determine the direction of motion or other motion information concerning the person's movement. Other motion information can include, for example, instantaneous and average velocities and accelerations. Such motion information can be useful for pedestrian dead-reckoning applications in which the mobile device attempts to determine its motion direction autonomously based on its own sensors without aid or corrections obtained by a Global Positioning System (GPS) and without aid or corrections obtained through other external means such as, for example, over a Wi-Fi or other wireless connection. Such dead-reckoning use cases can exist when, for example, the mobile device is out of an area where GPS, cellular, Wi-Fi or other wireless signals are available, or when transmitters or receivers for receiving data via such signals are turned off or disabled. In dead-reckoning applications, the uncertainties in motion direction and position generally continue to grow until external feedback or corrections are received. As a result, the reliability of an estimated motion direction and related motion information can decrease significantly over time and even render the estimations useless.

SUMMARY

The systems, methods and devices of this disclosure each have several innovative aspects, no single one of which is solely responsible for the desirable attributes disclosed herein.

One innovative aspect of the subject matter described in this disclosure can be implemented in a method that includes obtaining acceleration data for a mobile device in each of one or more directions. The method also includes determining a primary axis of motion of the mobile device based at least in part on the acceleration data. The method also includes determining a motion direction of the mobile device along the primary axis of motion. Determining the motion direction includes fitting the acceleration data, or data derived therefrom, to a bimodal distribution. A first peak of the bimodal distribution corresponds to a first motion direction along the primary axis of motion, and a second peak of the bimodal distribution corresponds to a second motion direction along the primary axis of motion opposite the first motion direction. The motion direction is then estimated relative to a coordinate system based at least in part on the bimodal distribution.

In some implementations, determining the motion direction of the mobile device relative to the coordinate system based at least in part on the bimodal distribution includes selecting the one of the first and second motion directions corresponding to the higher of the first and second peaks as the estimated motion direction of the mobile device. In some implementations, the method further includes comparing a first height of the first peak with a second height of the second peak and determining a reliability metric for the estimated motion direction based on a ratio of the first and second heights. In some implementations, the method can additionally or alternatively include analyzing a width of at least the higher of the first and second peaks and determining a reliability metric for the estimated motion direction based on the width.

In some implementations, the method also includes identifying an orientation of the mobile device relative to the coordinate system based on the acceleration data or other orientation data. In some such implementations, estimating the motion direction of the mobile device relative to the coordinate system also is based at least in part on the orientation. For example, the orientation data can include one or both of gyroscopic data and magnetometer data. In some implementations, the method also can include tracking a number of steps taken by a person carrying the mobile device or to which the mobile device is attached.

In some implementations, obtaining acceleration data for the mobile device includes measuring a first linear acceleration of the mobile device along a first directional axis in a mobile device coordinate system, measuring a second linear acceleration of the mobile device along a second directional axis in the mobile device coordinate system, and measuring a third linear acceleration of the mobile device along a third directional axis in the mobile device coordinate system. In some such implementations, the method also includes transforming the first, second and third linear accelerations in the mobile device coordinate system into first, second and third linear accelerations in a global coordinate system. For example, the first linear acceleration in the global coordinate system can be a first horizontal acceleration. The second linear acceleration in the global coordinate system can be a second horizontal acceleration. The third linear acceleration in the global coordinate system can be a vertical acceleration. In some such implementations, determining a primary axis of motion of the mobile device based at least in part on the acceleration data includes performing an eigendecomposition on at least the first and second horizontal accelerations to identify at least a first eigenvalue and a second eigenvalue. For example, the first eigenvalue can correspond to a first horizontal eigenvector and the second eigenvalue can correspond to a second horizontal eigenvector. In some such implementations, the first peak of the bimodal distribution corresponds to positive values of the first eigenvalue and the second peak of the bimodal distribution corresponds to negative values of the first eigenvalue.

Another innovative aspect of the subject matter described in this disclosure can be implemented in a mobile device that includes one or more sensors configured to measure acceleration data for the mobile device in each of one or more directions. The mobile device also includes one or more processors and a memory storing instructions that, when executed by the one or more processors, implement a plurality of modules. The modules include a motion direction estimation module configured to determine a primary axis of motion of the mobile device based at least in part on the acceleration data. The motion direction estimation module also is configured to determine a motion direction of the mobile device along the primary axis of motion. The determination of the motion direction includes fitting the acceleration data, or data derived therefrom, to a bimodal distribution. A first peak of the bimodal distribution corresponds to a first motion direction along the primary axis of motion, and a second peak of the bimodal distribution corresponds to a second motion direction along the primary axis of motion opposite the first motion direction. The motion direction estimation module is configured to estimate the motion direction of the mobile device relative to a coordinate system based at least in part on the bimodal distribution. In some implementations, the motion direction estimation module is configured to select the one of the first and second motion directions corresponding to the higher of the first and second peaks as the estimated motion direction of the mobile device.

In some implementations, the modules also include a reliability metric computation module configured to compare a first height of the first peak with a second height of the second peak, and to determine a reliability metric for the estimated motion direction based on a ratio of the first and second heights. Additionally or alternatively, in some implementations, the reliability metric computation module can be configured to analyze a width of at least the higher of the first and second peaks and to determine a reliability metric for the estimated motion direction based on the width.

In some implementations, the modules also include an orientation determination module configured to identify an orientation of the mobile device relative to the coordinate system based on the acceleration data or other orientation data. In some such implementations, the motion direction estimation module also is configured to estimate the motion direction of the mobile device based at least in part on the orientation. For example, the one or more sensors can include one or more gyroscopes or one or more magnetometers, and the orientation data can include one or both of gyroscopic data and magnetometer data. In some implementations, the modules also include a step detection module configured to track a number of steps taken by a person carrying the mobile device or to which the mobile device is attached.

In some implementations, the one or more sensors include a first linear accelerometer configured to measure a first linear acceleration of the mobile device along a first directional axis in a mobile device coordinate system, a second linear accelerometer configured to measure a second linear acceleration of the mobile device along a second directional axis in the mobile device coordinate system, and a third linear accelerometer configured to measure a third linear acceleration of the mobile device along a third directional axis in the mobile device coordinate system. In some such implementations, the motion direction estimation module is further configured to transform the first, second and third linear accelerations in the mobile device coordinate system into first, second and third linear accelerations in a global coordinate system. For example, the first linear acceleration in the global coordinate system can be a first horizontal acceleration, the second linear acceleration in the global coordinate system can be a second horizontal acceleration, and the third linear acceleration in the global coordinate system can be a vertical acceleration.

In some such implementations, to estimate the primary axis of motion of the mobile device relative to the coordinate system, the motion direction estimation module is configured to perform an eigendecomposition on at least the first and the second horizontal accelerations to identify at least a first eigenvalue and a second eigenvalue. For example, the first eigenvalue can correspond to a first horizontal eigenvector and the second eigenvalue can correspond to a second horizontal eigenvector. In some such implementations, first peak of the bimodal distribution corresponds to positive values of the first eigenvalue and the second peak of the bimodal distribution corresponds to negative values of the first eigenvalue.

Another innovative aspect of the subject matter described in this disclosure can be implemented in tangible computer-readable storage media including non-transitory instructions that, when executed by one or more processors, are configured to receive acceleration data for a mobile device in each of one or more directions. The instructions also are configured to determine a primary axis of motion of the mobile device based at least in part on the acceleration data. The instructions also are configured to determine a motion direction of the mobile device along the primary axis of motion. The determination of the motion direction includes fitting the acceleration data, or data derived therefrom, to a bimodal distribution. A first peak of the bimodal distribution corresponds to a first motion direction along the primary axis of motion, and a second peak of the bimodal distribution corresponds to a second motion direction along the primary axis of motion opposite the first motion direction. The instructions are configured to estimate the motion direction of the mobile device relative to a coordinate system based at least in part on the bimodal distribution. In some implementations, the instructions to determine the motion direction include instructions for selecting the one of the first and second motion directions corresponding to the higher of the first and second peaks as the estimated motion direction of the mobile device.

In some implementations, the media also includes instructions for comparing a first height of the first peak with a second height of the second peak and for determining a reliability metric for the estimated motion direction based on a ratio of the first and second heights. Additionally or alternatively, in some implementations, the media includes instructions for analyzing a width of at least the higher of the first and second peaks and for determining a reliability metric for the estimated motion direction based on the width.

In some implementations, the media also includes instructions for identifying an orientation of the mobile device relative to the coordinate system based on the acceleration data or other orientation data. In some such implementations, the estimated motion direction of the mobile device is based at least in part on the orientation. In some implementations, the media also includes instructions for tracking a number of steps taken by a person carrying the mobile device or to which the mobile device is attached.

In some implementations, the instructions for estimating the primary axis of motion of the mobile device include instructions for performing an eigendecomposition on the acceleration data to identify at least a first eigenvalue and a second eigenvalue corresponding to a first horizontal eigenvector and a second horizontal eigenvector. For example, the first peak of the bimodal distribution can correspond to positive values of the first eigenvalue and the second peak of the bimodal distribution can correspond to negative values of the first eigenvalue.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1A:
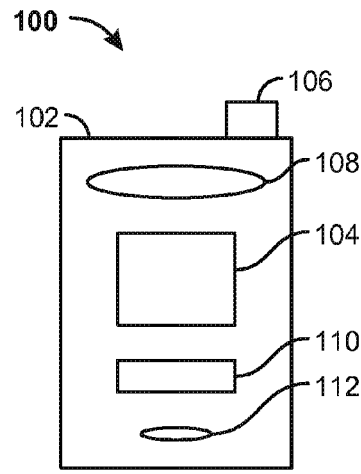
FIGS. 1A and 1B are system block diagrams illustrating an example mobile device.

The following description is directed to certain implementations for the purposes of describing the innovative aspects of this disclosure. However, a person having ordinary skill in the art will readily recognize that the teachings herein can be applied in a multitude of different ways. The described implementations may generally be implemented in any mobile (also referred to as "moveable" or "portable") electronic device, apparatus, or system. More particularly, it is contemplated that the described implementations can be included in or associated with a variety of mobile electronic devices such as, but not limited to: mobile telephones, multimedia Internet enabled cellular telephones, smart-phones, mobile television receivers, Bluetooth® devices, personal data assistants (PDAs), wireless electronic mail receivers, hand-held or portable computers, netbooks, notebooks, smartbooks, tablets, global positioning system (GPS) receivers/navigators, cameras, digital media players (for example, MP3 players), camcorders, portable game consoles, wrist watches, and electronic reading devices (for example, e-readers), among other possible devices. Thus, the teachings are not intended to be limited to the implementations depicted solely in the Figures, but instead have wide applicability as will be readily apparent to one having ordinary skill in the art.

Some implementations relate to devices, apparatus, methods, or computer-readable storage media including instructions for calculating a reliability metric for determining a measure of reliability in an estimated motion vector M. Some implementations relate to apparatus, methods, or computer-readable storage media including instructions for fitting acceleration data or data derived from such acceleration data to a bimodal probability distribution and for determining a direction of motion M based on the bimodal probability distribution. Some implementations relate to apparatus, methods, or computer-readable storage media including instructions for selecting one or more parameters to determine a direction of motion M. For example, a use case can be identified and one or more parameters can be adjusted or optimized to more accurately estimate the direction of motion M. Some other implementations relate to apparatus, methods, or computer-readable storage media including instructions for determining, in parallel, a plurality of estimated directions of motion M, where each estimated direction of motion is based on a different set of parameters predefined for a corresponding use case. In some such implementations, the direction of motion M having the highest respective reliability metric is selected as the output.

Particular implementations of the subject matter described in this disclosure can be implemented to realize one or more of the following potential advantages: a more reliable (or "certain," "accurate," or "precise") estimated motion direction M can be determined; and a measure of reliability of the estimated motion direction M can be determined to, for example, make a determination as to how to select a future estimated motion direction or how to use the estimated motion direction M. For example, in some implementations, to save power, a network interface configured to communicate with a GPS, SNS, or other positioning or navigation system is turned off or otherwise disabled as long as the reliability metric for an estimated motion direction M is above a threshold value. In some such implementations, when the reliability metric falls below the threshold, the network interface is turned on or otherwise enabled so that positioning or other calibration data can be received to correct or refine the estimated motion direction M.

Figure 1B:
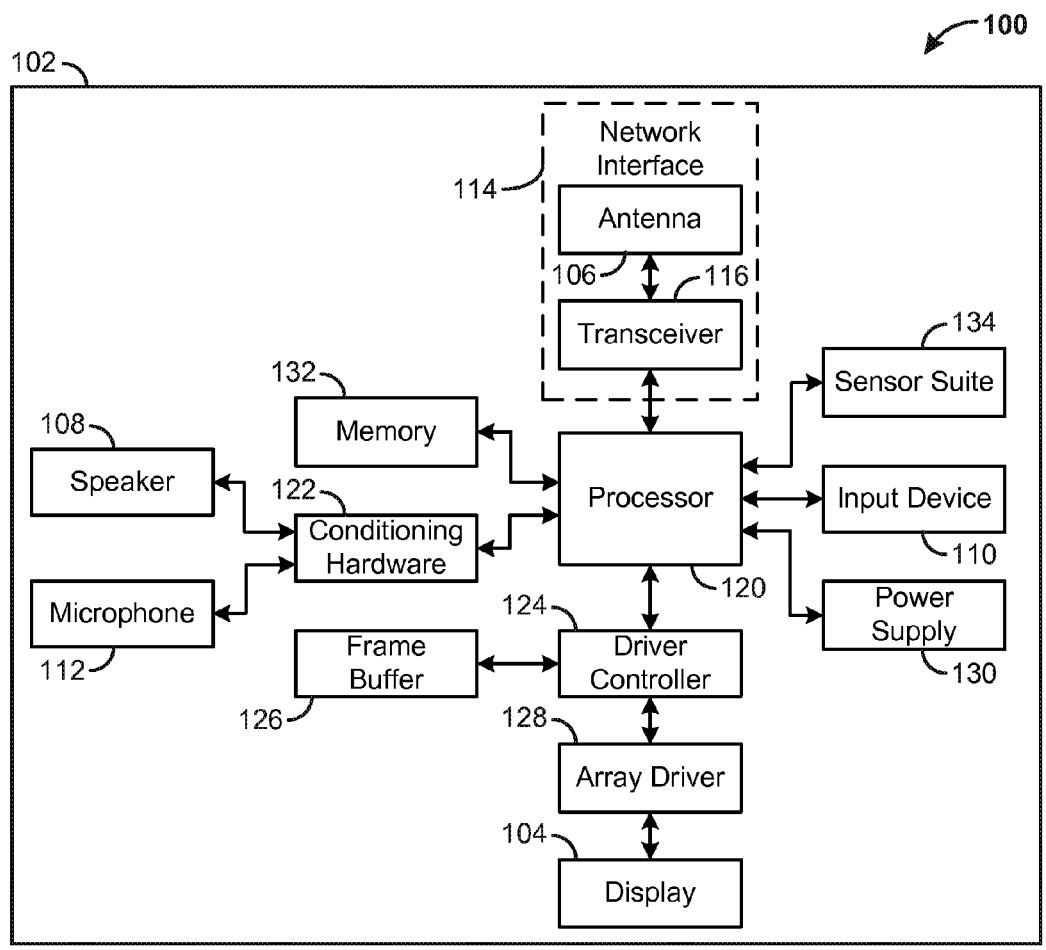

FIGS. 1A and 1B are system block diagrams illustrating an example mobile device 100. The mobile device 100 can be, for example, a smart phone, a cellular phone or a mobile telephone. However, as described above, some of the same components of the mobile device 100, or variations thereof, also are illustrative of various types of other mobile devices including display devices and computing devices such as computers, tablets, e-readers, gaming devices and other hand-held devices and portable media devices.

The mobile device 100 includes a housing 102, a display 104, an antenna 106, a speaker 108, an input device 110 and a microphone 112. The housing 102 can be formed by any of a variety of manufacturing processes, including injection molding and vacuum forming. In addition, the housing 102 can be made from any of a variety of materials, including plastic, metal, glass, rubber and ceramic, or a combination of these or other materials. The housing 102 can include removable portions (not shown) that can be interchanged with other removable portions of different color, or containing different logos, pictures, or symbols.

The display 104 can be or can include one or more of any of a variety of types of displays, including a bi-stable or analog display. The display 104 can be a flat-panel display, such as an active matrix display. For example, the display 104 can be a plasma display, an electroluminescent display (ELD), a light-emitting diode (LED) display, an organic LED (OLED) display, a liquid-crystal display (LCD), a super-twisted nematic (STN) LCD, or thin-film transistor (TFT) LCD. The display 104 also can be or can include an interferometric modulator (IMOD)-based display. The term IMOD or interferometric light modulator refers to a device that selectively absorbs and/or reflects light using the principles of optical interference. In some implementations, an IMOD display element includes a pair of conductive plates, one or both of which can be transparent and/or reflective, wholly or in part, and capable of relative motion upon application of an appropriate electrical signal. For example, one plate can include a stationary layer deposited over, on or supported by a substrate and the other plate can include a reflective membrane separated from the stationary layer by an air gap. The position of one plate in relation to another can change the optical interference of light incident on the IMOD display element. IMOD-based display devices have a wide range of applications, and may be used in improving existing products and creating new products, especially those with display capabilities.

Some physical components of the mobile device 100 are schematically illustrated in FIG. 1A. The mobile device 100 can include additional components at least partially enclosed within the housing 102. For example, FIG. 1B illustrates various example components that can be included at least partially within the housing 102. The mobile device 100 includes a network interface 114 that can include the antenna 106, which can be coupled with a transceiver 116. The network interface 114 can be a source for image data that could be displayed on the display 104 of the mobile device 100. The transceiver 116 is connected to a processor 120, which is connected to conditioning hardware 122. The conditioning hardware 122 can condition a signal (for example, filter or otherwise manipulate the signal), such as that received or transmitted via the transceiver 116 and the network interface 114. The conditioning hardware 122 can be connected to the speaker 108 and the microphone 112. The processor 120 also can be connected to the input device 110 (which may collectively refer to a number of input devices of various types and incorporating various input mechanisms and sensing technologies). The processor 120 also can be connected to a driver controller 124. The driver controller 124 can be coupled to a frame buffer 126 and to an array driver 128, which in turn can be coupled to drive the display 104.

In practice, the network interface 114 can collectively refer to a number of network interfaces usable to exchange data over a variety of types of wireless connections according to a variety of network protocols, which may include both proprietary and non-proprietary protocols, and for a variety of applications. In some implementations, the network interface 114 can transmit and receive positioning data (also referred to herein generally as "calibration data"), such as that received from a GPS or Satellite Navigation System (SNS), as described below. In some implementations, the network interface 114 also can transmit and receive telephone data, such as that received from cellular towers or base stations. In some implementations, the network interface 114 also can transmit and receive such data or other data over a Wi-Fi or other wireless connection over one or more networks.

The antenna 106 can generally transmit and receive various signals. In some implementations, the antenna 106 transmits and receives radio frequency (RF) signals according to the IEEE 16.11 standard, including IEEE 16.11(a), (b), or (g), or the IEEE 802.11 standard, including IEEE 802.11a, b, g, n, and further implementations thereof. In some other implementations, the antenna 106 transmits and receives RF signals according to the Bluetooth® standard. In the case of a cellular telephone, the antenna 106 can be designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G, 4G or 5G technology.

The network interface 114 also can have some conditioning or processing capabilities to relieve, for example, data conditioning or processing requirements of the conditioning hardware 122 or the processor 120. For example, the transceiver 116 can pre-process the signals received from the antenna 106 so that they can be received by and further manipulated by the conditioning hardware 122 or the processor 120. The transceiver 116 also can process signals received from the conditioning hardware 122 or the processor 120 so that they can be transmitted from the mobile device 100 via the antenna 106.

The processor 120 controls the overall operations of the mobile device 100. The processor 120 can include one or more microcontrollers, CPUs, or logic units to control operation of the mobile device 100 (also referred to herein collectively as "the processor 120"). The conditioning hardware 122 can include amplifiers and filters for transmitting signals to the speaker 108, and for receiving signals from the microphone 112. The conditioning hardware 122 can be implemented as discrete components within the mobile device 100, or can be incorporated within or integrated with the processor 120 or other components.

In some implementations, the input device 110 can allow, for example, a user to control the operation of the mobile device 100. Again, the input device 110 may collectively refer to a number of distinct or integrated input devices based on a variety of input mechanisms and sensing technologies. The input device 110 can include a keypad, such as a QWERTY keyboard or a telephone keypad, a button, a switch, a rocker, a touch-sensitive screen, a touch-sensitive screen integrated with the display 104, or a pressure- or heat-sensitive membrane. The microphone 112 also can be an input device for the mobile device 100. In some implementations, voice commands through the microphone 112 can be used for controlling operations of the mobile device 100.

In some implementations, a power supply 130 can provide power to some or all of the components of the mobile device 100 described herein including the processor 120 and the display 104. The power supply 130 can include one or more of a variety of energy storage devices. For example, the power supply 130 can include a rechargeable battery, such as a nickel-cadmium battery or a lithium-ion battery. In implementations using a rechargeable battery, the rechargeable battery can be chargeable using power coming from, for example, a wall socket (or "outlet") or a photovoltaic device or array. Alternatively, the rechargeable battery can be wirelessly chargeable via a magnetic induction or other mechanism. The power supply 130 also can be a renewable energy source, a capacitor, or a solar cell, including a plastic solar cell or solar-cell paint.

The mobile device 100 also includes a memory 132 connected with the processor 120. The memory 132 can collectively refer to any of a number of suitable data storage devices or mechanisms. In some implementations, the memory 132 includes one or more volatile storage devices and one or more non-volatile storage devices. The memory 132 also can include one or more removable memory devices such as memory cards, memory sticks, flash drives or other removable memory devices or components. Additionally, while described as separate from the processor 120, some or all of the memory 132 can be provided with the processor 120, provided on the same chip or die as the processor 120, or be included as part of a package including the processor 120.

The mobile device 100 also includes a suite (or "set") 134 of one or more sensors. The sensors in the sensor suite 134 are communicatively connected with the processor 120, and in some implementations, also with the conditioning hardware 122 or some other conditioning hardware within the housing 102. In some implementations, the sensor suite 134 includes some conditioning or processing capabilities for conditioning or processing the signals measured by or obtained from the sensors of the sensor suite 134 before such signals are communicated or passed to the processor 120 or conditioning hardware. Some of the sensors in the sensor suite 134 can be inertial sensors, and thus, the sensor suite 134 also may be referred to as an inertial measurement unit (IMU) 134.

Figure 2:
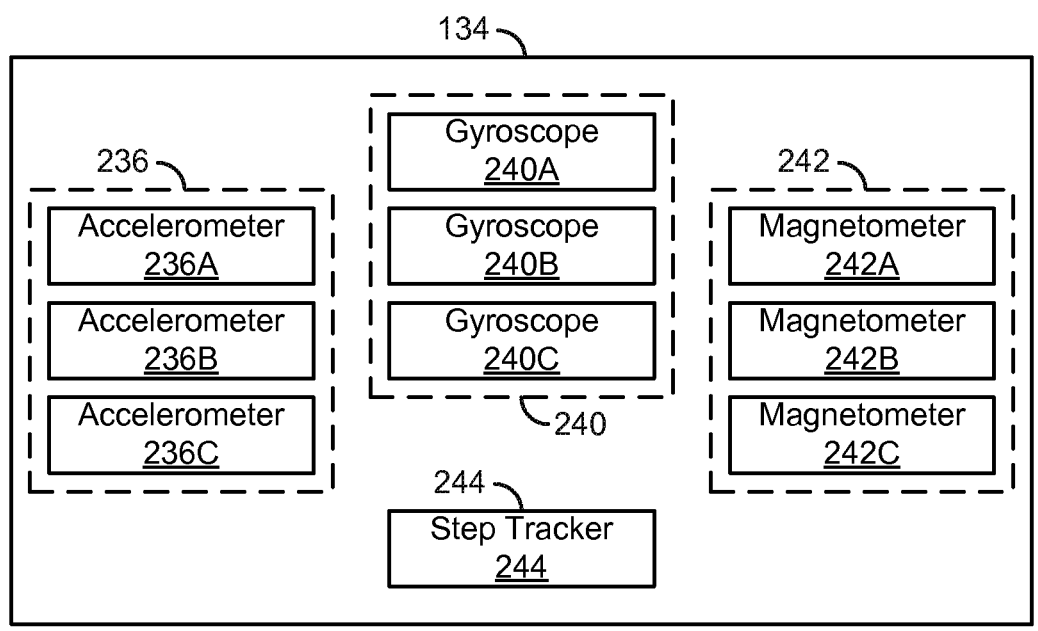
FIG. 2 illustrates a system block diagram of an example sensor suite.

FIG. 2 illustrates a system block diagram of an example sensor suite 134. Although the sensors in the sensor suite 134 are illustrated as a number of individual components located within a single sensor package, some or all of the sensors in the sensor suite 134 can be discrete components or combined or integrated into one or more sensor packages located within the housing 102 of the mobile device 100. In some implementations, the sensor suite 134 includes three linear accelerometers 236A, 236B and 236C, each of which measures linear acceleration or velocity (also referred to herein collectively as "linear acceleration data," "linear velocity data" or generally as "motion data") along a particular axis of a mobile device coordinate system. In some implementations, each of the linear accelerometers 236A, 236B and 236C (also referred to herein collectively as "accelerometers 236" or "accelerometer 236") measures linear acceleration data along a particular respective orthogonal axis of a Cartesian coordinate system. In some other implementations, the functions of the three linear accelerometers 236A, 236B and 236C can be combined or integrated into a single three-dimensional accelerometer 236.

Figure 3:
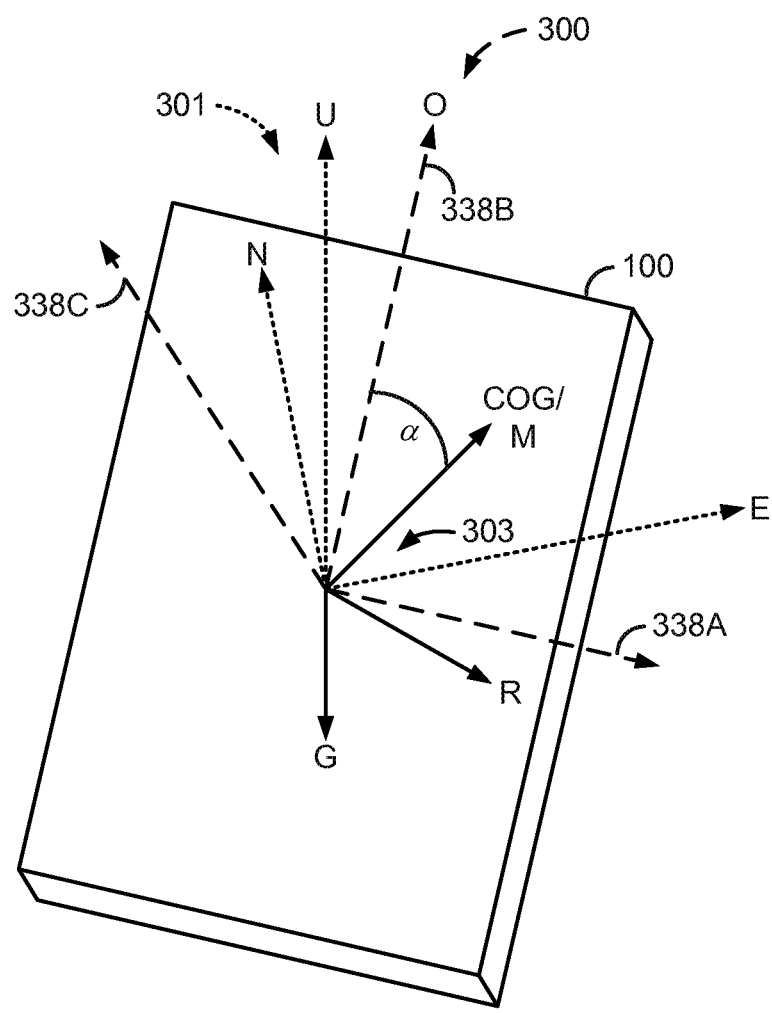
FIG. 3 shows an example mobile device coordinate system relative to an example mobile device.

FIG. 3 shows an example mobile device coordinate system 300 relative to an example mobile device 100. In the illustrated implementation, the mobile device coordinate system 300 (also referred to as the "IMU coordinate system 300") is defined and fixed relative to the mobile device 100 itself. Such a coordinate system 300 is an example of a "device-centric" coordinate system in which an origin of three orthogonal axes 338A, 338B and 338C lies within the mobile device 100. For example, the origin of the mobile device coordinate system 300 may be located at the geometric center of the mobile device 100, at the center of mass of the mobile device 100, at a corner of the mobile device 100 or at another suitable or convenient reference location. The mobile device coordinate system 300 includes the three orthogonal axes 338A, 338B and 338C that extend along respective width, length and depth dimension directions of the mobile device. In some implementations, the first linear accelerometer 236A can measure linear acceleration data (also referred to herein simply as "linear acceleration") along the first axis 338A, the second linear accelerometer 236B can measure linear acceleration data along the second orthogonal axis 338B and the third linear accelerometer 236C can measure linear acceleration data along the third orthogonal axis 338C. Also superimposed on the mobile device 100 is an example East, North and Up (ENU) Cardinal-based Cartesian coordinate system 301 showing East (E), North (N) and Up (U) directions. Also shown is the direction of gravity (G). In the illustrated example, the orientation (0) of the mobile device 100 is defined as the direction corresponding to the positive direction of the axis 338B.

In some implementations, the sensor suite 134 of FIG. 2 includes three gyroscopes 240A, 240B and 240C, each of which measures angular acceleration, angular velocity or rotation (also referred to herein collectively as "angular acceleration data," "angular velocity data," "rotation data" or generally as "orientation data") about a particular axis of the mobile device coordinate system 300. For example, the first gyroscope 240A can measure rotation data about the first axis 338A, the second gyroscope 240B can measure rotation data about the second axis 338B and the third gyroscope 240C can measure rotation data about the third axis 338C. Such rotation data also can be expressed in terms of pitch, roll and yaw. In some other implementations, the functions of the three gyroscopes 240A, 240B and 240C (also referred to herein collectively as "gyroscopes 240" or "gyroscope 234") can be combined or integrated into a single three-dimensional gyroscope 240.

In some implementations, the sensor suite 134 includes three magnetometers 242A, 242B and 242C, each of which measures magnet field or force (also referred to collectively herein as "magnetic field data," "magnetic force data," "magnetic data" or generally as "orientation data") along a particular axis of the mobile device coordinate system 300. For example, the first magnetometer 242A can measure magnetic field data along the first axis 338A, the second magnetometer 242B can measure magnetic field data along the second axis 338B and the third magnetometer 242C can measure magnetic field data along the third axis 338C. In some other implementations, the functions of the three magnetometers 242A, 242B and 242C (also referred to herein collectively as "magnetometers 242," "magnetometer 242" or "compass 242") can be combined or integrated into a single three-dimensional magnetometer 242.

In some implementations, the sensor suite 134 also includes a step tracker 244, such as a pedometer, distinct from the accelerometers and gyroscopes described above to determine when steps are taken by a person (also referred to herein as a "pedestrian," "user" or "viewer") and to count the number of steps taken, for example, during a period of time. In some other implementations, the functions associated with the step tracker 244 are implemented by the processor 120 in conjunction with some or all of the sensors described above in the sensor suite 134, including the accelerometers 236A, 236B and 236C or gyroscopes 240A, 240B and 240C. For example, the processor 120 can determine when steps are taken based on acceleration or other motion information obtained from or derived from linear acceleration or orientation data obtained from the sensor suite 134.

In some implementations, the sensor suite 134 includes all of the sensors described above. In some other implementations, the sensor suite 134 can include a subset of the sensors described above such as, for example, only linear accelerometers, only linear accelerometers and gyroscopes, only linear accelerometers and magnetometers, or another suitable subset of sensors. In some implementations, the sensor suite 134 can include other sensors in addition to those described above. Additionally, while the sensors described above were described in groups of three (for example, three linear accelerometers 236A, 236B and 236C), in some other implementations the sensor suite 134 can include different numbers of each type of sensor; that is, more or fewer than three linear accelerometers 236A, 236B and 236C, more or fewer than three gyroscopes 240A, 240B and 240C, and more or fewer than three magnetometers 242A, 242B and 242C.

Additionally, in some implementations, gestures made by moving the mobile device in predefined or learned patterns (for example, flipping, rotating, or swinging the mobile device with a user's hand) can be sensed or recognized via the sensor suite 134 in conjunction with the processor 120, and also used in addition to or in lieu of the input device 110 for controlling operations of the mobile device 100.

As referenced above, a variety of existing and anticipated applications for mobile electronic devices, such as the mobile device 100, utilize knowledge of the mobile device's position, orientation (also referred to herein as "heading"), or motion direction. For example, in situations in which a person who is carrying the mobile device is walking or otherwise moving about, it can be useful for the mobile device 100 to have the capability to determine the direction of motion or other motion information concerning the person's movement. Other motion information can include, for example, instantaneous and average velocities and accelerations. Such motion information can be useful for pedestrian dead-reckoning applications where the mobile device 100 determines its motion direction autonomously based on sensor data measured by or obtained from the sensor suite 134 without aid or corrections (also referred to herein as "calibration data") obtained by a GPS or SNS and without aid or corrections obtained through other external means such as, for example, over a Wi-Fi or other wireless connection via the network interface 114. Such dead-reckoning use cases can exist when, for example, the mobile device 100 is out of an area where GPS, cellular, Wi-Fi or other wireless signals are available, or when transmitters or receivers (also referred to collectively as "transceivers"), such as the transceiver 116, for transmitting and receiving data via such signals are turned off or disabled.

In dead-reckoning use cases, the mobile device 100 estimates the person's motion direction (M) based on sensor data, including some or all of the motion data or orientation data described above, measured by, obtained from, or derived from measurements measured by or obtained from, some or all of the sensors in the sensor suite 134. Based on some or all of this sensor data, the mobile device 100 can determine its direction of orientation (O) relative to a global coordinate system such as, for example, a Cartesian coordinate system such as an Earth-centric Earth-fixed (ECEF) coordinate system, a Cardinal-based Cartesian coordinate system such as an ENU coordinate system, or a geodetic coordinate system. And based on the determined orientation O and other sensor data, the mobile device 100 then determines its "absolute" or "dominant" direction of motion M; that is, the direction of motion of the person carrying the mobile device 100. The direction of motion M also can be defined relative to a global coordinate system, and in some implementations, in the same global coordinate system used to define the direction of orientation O. In this way, the sensor data analysis, the determination of the motion direction M, and a determination of its reliability, may be simplified. Additionally, in some implementations, the motion device 100 may represent the motion direction M or orientation direction O as time-varying data signals. For example, the motion direction M can be characterized or defined as a motion vector M (and also referred to as such herein) including one or both of a time-varying direction and a time-varying magnitude.

Figure 4:
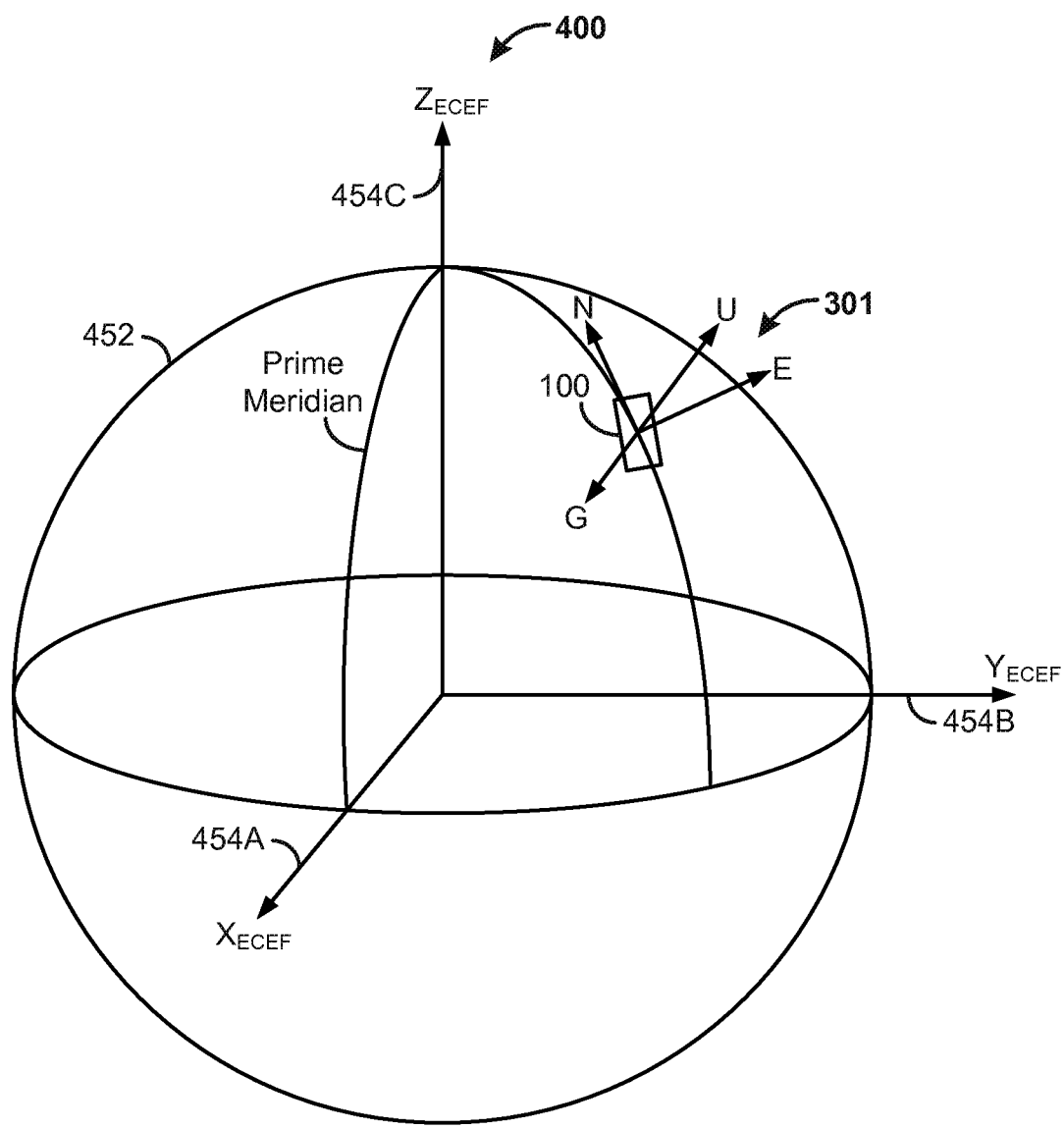
FIG. 4 shows a diagram of a representation of the Earth including an interposed ECEF coordinate system and an ENU coordinate system relative to a representation of a mobile device.

FIG. 4 shows a diagram of a representation 452 of the Earth including an interposed ECEF coordinate system 400 and an ENU coordinate system 301 relative to a representation of the mobile device 100. The ECEF coordinate system includes orthogonal axes 454A, 454B and 454C corresponding to directions $X_{ECEF}$, $Y_{ECEF}$ and $Z_{ECEF}$, respectively. As shown, position, velocity and acceleration or other motion data for the mobile device 100 can be defined in terms of both the $X_{ECEF}$, $Y_{ECEF}$ and $Z_{ECEF}$ directions of the ECEF coordination system 400 as well as the East (E), North (N) and Up (U) directions of the ENU coordinate system 301. In the ENU coordinate system, the Up direction can be defined as the direction opposing gravity (G) or as a ray originating from the geometric center of Earth, while East and North can be defined in terms of magnetic North or geometric (or "true") North.

In some implementations, the direction, velocity, acceleration or other motion data of or concerning the mobile device 100 also can be represented or determined in terms of a mobile-device-centric Right, Course-Over-Ground, and Up (RCU) coordinate system. For example, the Course-Over-Ground (COG) direction can describe motion along a forward-backward axis along an imaginary horizontal plane on which the mobile device 100 is moving at a point in time, while the Right (R) direction can describe lateral motion along a right-left axis perpendicular to the forward-backward axis on the horizontal plane, and the Up (U) direction describes motion along a vertical axis perpendicular to the horizontal plane. FIG. 3 also shows an example relationship between the IMU coordinate system 300, the ENU coordinate system 301 and an RCU coordinate system 303 (in the example implementation, the direction Up (U) is the same in both the ENU coordinate system 301 and in the RCU coordinate system 303, although this is not required). In the illustrated example, and in the description of various implementations presented herein, the direction of motion (M) of the mobile device 100 is illustrated as being along the COG direction, which itself can be defined in terms of a global coordinate system as described above. However, in other implementations the motion vector M can be described in terms of two or more of the COG, Right (R) and Up (U) directions, or in terms of another coordinate system.

In some implementations, the motion direction M can be estimated or defined in terms of the orientation direction O rotated by an alignment (or "misalignment") angle α. As described above, the orientation direction O describes the orientation or heading of the mobile device 100 itself. The orientation direction O can be determined by the mobile device 100 through an analysis of linear acceleration measurements, angular acceleration measurements, rotation measurements, magnetic field measurements, or a combination of such measurements or other measurements, obtained by the sensors of the sensor suite 134. For example, the direction of gravity (G) can be estimated by analyzing the acceleration data measured by the accelerometers 236A, 236B and 236C. For example, in some implementations the processor 120 determines that the direction corresponding to the strongest identified acceleration is the direction of gravity. Additionally or alternatively, the processor 120 can determine the direction of magnetic North using the magnetometers 242A, 242B and 242C. Based on the identified directions of gravity or magnetic North, the mobile device 100 can determine the orientation direction O. As described above, the orientation direction O can be rotated or transformed into a variety of suitable and convenient coordinate systems for describing the COG or motion vector M.

Figure 5C:
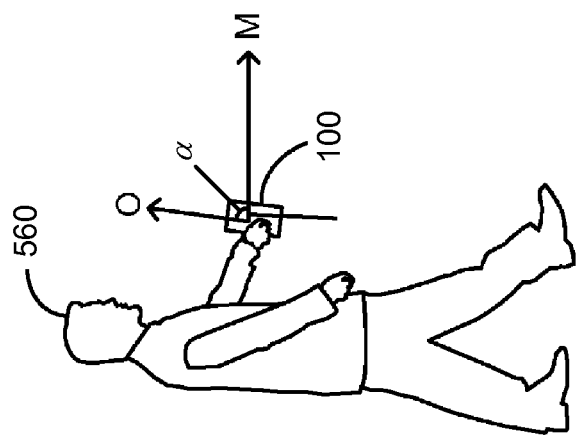
FIG. 5C shows an example scenario in which a mobile device is being carried in a person's hand.
Figure 5B:
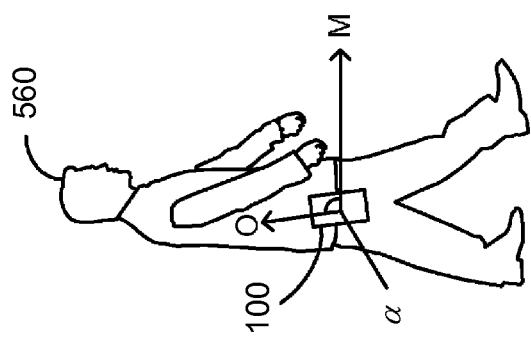
FIG. 5B shows an example scenario in which a mobile device is being carried in a person's side pants pocket.
Figure 5A:
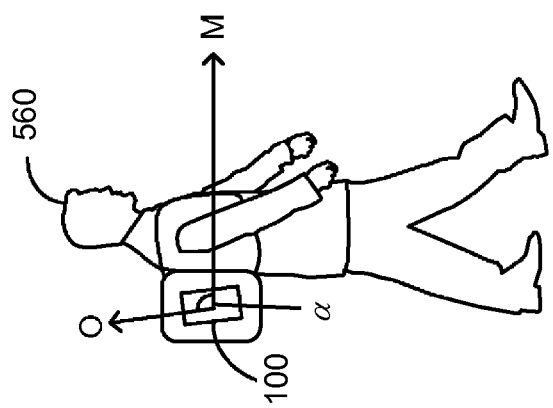
FIG. 5A shows an example scenario in which a mobile device is being carried in a person's backpack.

The alignment angle α describes the discrepancy between the orientation direction O and the motion direction M. For example, depending on the position and manner in which the mobile device 100 is carried relative to a person, the orientation O of the mobile device 100 may not be aligned with the person's direction of motion M. FIG. 5A shows an example scenario in which the mobile device 100 is being carried in a person's 560 backpack, while FIG. 5B shows an example scenario in which the mobile device 100 is being carried in the person's 560 side pants pocket and FIG. 5C shows an example scenario in which the mobile device 100 is being carried in the person's 560 hand. As is readily apparent, the orientation O of the mobile device 100 changes relative to the person and relative to the Earth depending on the location of the mobile device 100 on the person as well as depending on the person's motion. For example, as the mobile device 100 moves, turns, swings, rocks, or pivots relative to the direction of motion M of the person carrying the mobile device 100, the alignment angle α changes.

The more the mobile device 100 moves relative to the person, the greater the potential likelihood for uncertainty in an estimated motion direction M. More specifically, the more random or non-periodic the orientation O changes, the greater the uncertainty in the resultant estimations of the alignment angle α and the motion direction M. Examples of periodic changes are those that result from periodic motion, such as that associated with walking, jogging, running or stair climbing. Because the current motion direction M may be based on past and current acceleration or other motion data, the uncertainty in the reliability of the estimated motion direction M can continue to grow in dead-reckoning use cases. And in fact, the more random or unpredictable the movement of the mobile device 100, the greater the rate at which the uncertainty in the estimated motion direction typically grows.

Figure 6:
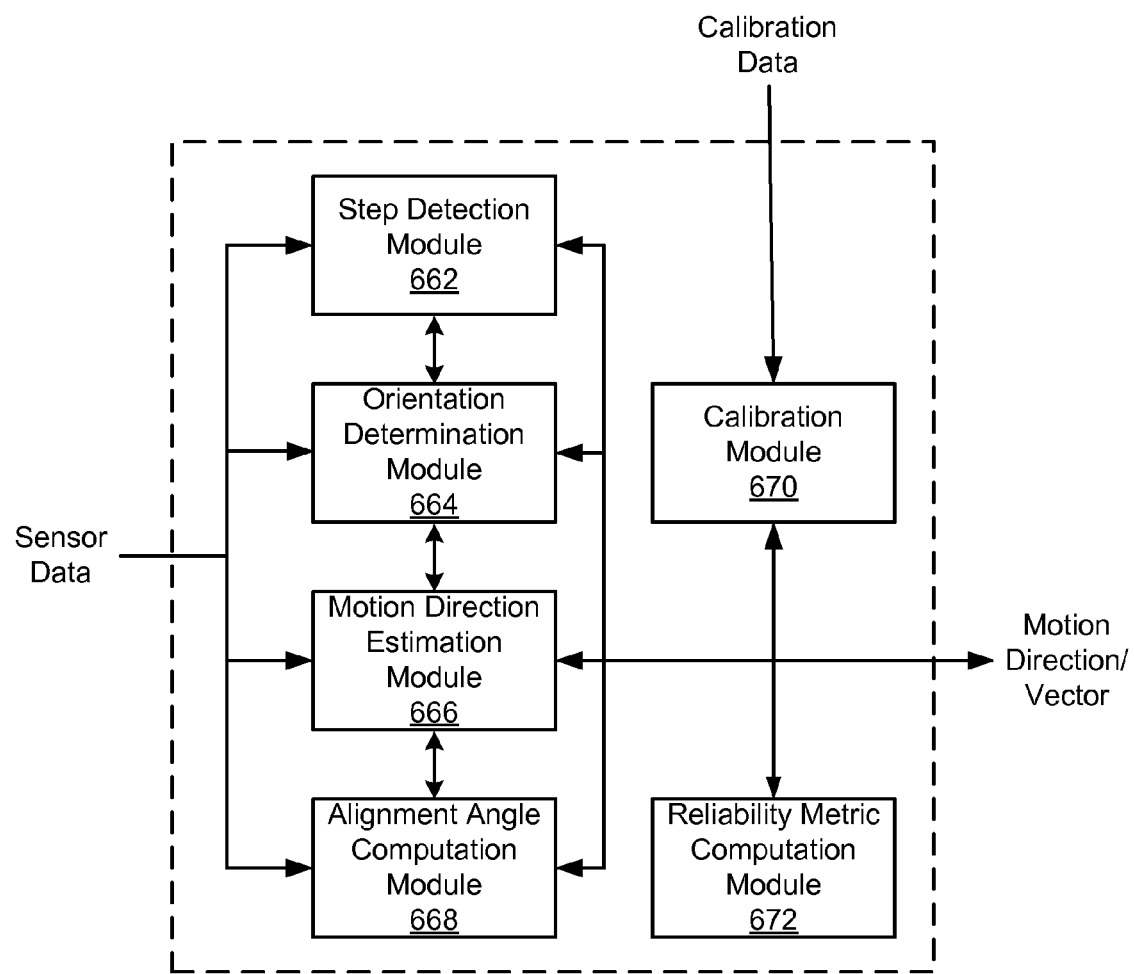
FIG. 6 shows a block diagram of example modules that can be stored in a memory and implemented in conjunction with a processor to perform one or more of the methods or processes described.

The memory 132 includes executable code, instructions or software. In some implementations, the executable code includes, or can be characterized as, a number of code blocks or modules. FIG. 6 shows a block diagram of example modules that can be stored in the memory 132 and implemented in conjunction with the processor 120 to perform one or more of the methods or processes described. For example, instructions for carrying out the functions of the example modules can be stored in the memory 132 and executed by the processor 120 to perform one or more of the methods described. In the illustrated implementation, a step detection module 662 receives motion information from the sensor suite 134 including one or both of the step tracker 244 (if present) or from, for example, linear accelerometers 236 or gyroscopes 240. Such motion information also can be provided directly or indirectly to an orientation determination module 664 and a motion direction estimation module 666.

The step detection module 662 analyzes the motion information from the step tracker 244, the accelerometers 236 or other ones of the sensors in the sensor suite 134 to detect steps taken by the person carrying the mobile device 100. For example, the step detection module 662 can analyze the motion information to identify motion patterns or signatures corresponding to human motion, which it can then use to identify a type of motion or "use case." For example, the step detection module 662 may determine based on the identified motion information that the person is walking, jogging, running or stair climbing. In some implementations, the step detection module 662 also can determine, track or record other step information such as, for example, step lengths, step durations, a running count of steps, or accelerations, velocities, or rotations corresponding to steps (also referred to herein collectively as "step data").

The orientation determination module 664 determines the orientation direction O through an analysis of linear acceleration measurements, angular acceleration measurements, magnetic field measurements, or a combination of such measurements or sensor data, obtained by the sensors of the sensor suite 134. For example, as described above, the direction of gravity G can be estimated by analyzing the acceleration data measured by the accelerometers 236A, 236B and 236C. For example, in some implementations the orientation determination module 664 determines that the direction corresponding to the strongest identified acceleration is the direction of gravity G (whether the strongest acceleration is identified by the accelerometers 236 or sensor suite 134 itself prior to being input to the orientation determination module 664, or whether identified by the orientation determination module 664 itself or another module in conjunction with the processor 120 based on the acceleration data received from the accelerometers 236 or other sensors of the sensor suite 134). Additionally or alternatively, the orientation determination module 664 can similarly determine the direction of magnetic North using the magnetometers 242A, 242B and 242C. Based on the identified directions of gravity G or magnetic North N, the orientation determination module 664 determines the orientation O. As described above, the orientation O can be rotated or transformed into one or more of a variety of suitable and convenient coordinate systems for describing the motion vector M. For example, the orientation determination module 664 can provide the orientation O of the mobile device 100 in an ECEF, ENU or geodetic coordinate system. Additionally, as described above, like the motion direction/vector M, COG direction/vector, alignment angle α, or other directions, vectors, angles or other data described herein, the orientation O can be computed (or "estimated" or "determined") on a continuous or periodic basis and may thus be described, stored or tracked as a time-varying signal.

In some implementations, the motion direction estimation module 666 receives the orientation O from the orientation determination module 664 and computes the motion vector M based on the orientation O, including, in some implementations, present and past values of the orientation O or past values of the motion vector M. In some implementations, the motion direction estimation module 666 also receives sensor data directly from the sensor suite 134 and uses such sensor data, or information derived from such sensor data, to compute the motion vector M. For example, the motion direction estimation module 666 can determine the motion vector M based on the orientation O and the acceleration data or other sensor data measured by the accelerometers 236. Additionally or alternatively, in some implementations, the motion direction estimation module 666 can determine the motion vector M based on the orientation O and the rotation data or other sensor data measured by the gyroscopes 240, or sensor data measured by other sensors.

In some implementations, the motion direction estimation module 666 also can receive present and past values of the alignment angle α from an alignment angle computation module 668, which can be configured to determine the alignment angle α from the orientation O as well as sensor data or other motion information obtained from the sensor suite 134. In some implementations, the motion direction estimation module 666 determines the motion vector M based at least partially on the alignment angle α received from the alignment angle computation module 668. Conversely, in some other implementations, the alignment angle computation module 668 determines the alignment angle α based at least partially on the motion vector M received from the motion direction estimation module 666. That is, once the orientation O and either of the alignment angle α or the motion vector M is determined, the other one of the alignment angle α or the motion vector M can be readily calculated by definition.

In some implementations, when a GPS, SNS, or other positioning system receiver in the mobile device 100, such as the transceiver 116, is turned on or enabled, and in a geographic location where it is capable of receiving signals from such positioning systems, calibration data can be received via the network interface 114 and processed by a calibration module 670, which then passes calibration data to the motion direction estimation module 666 to refine, revise or otherwise correct the motion vector M. Additionally or alternatively, in some implementations, the calibration module 670 can receive other calibration data, such as over a cellular or Wi-Fi connection, when enabled.

The estimated motion direction or motion vector M can be output from or generated by the motion direction estimation module 666 in any suitable coordinate system such as the ECEF and ENU coordinate systems described above. For example, in one implementation, the motion direction estimation module 666 outputs an estimated motion vector M in terms of a true or magnetic North direction component and an East direction component. In some implementations, the estimated motion vector M also can be represented in terms of an Up direction component. In some other implementations, the Up component is neglected and so the estimated motion vector M can be simplified or approximated to a COG motion vector as described above.

In some implementations, the motion direction estimation module 666 receives step data from the step detection module 662 and computes the motion vector M based on the step data. For example, the motion direction estimation module 666 can use the step data to more accurately calculate or estimate the true motion vector M by canceling out periodic acceleration components associated with typical human motion, such as periodic accelerations associated with walking, jogging, running or stair climbing. For example, in typical human motion, the directions of motion and acceleration change within a given step and from one step to the next consecutive step as a result of the natural biomechanics of bipedal human motion. For example, even in the case of a person walking at an unchanging pace in a straight line on a level surface, rather than having zero acceleration and constant forward motion, a person's motion and acceleration shift laterally left to right (for example, motion left during a step with the left foot and motion right during a step with the right foot) with successive steps. A walking person's gait also has motion and acceleration components that change vertically up and down and transversely forward and backward within each individual step's duration. For example, as a person takes a step forward, the person's center of gravity moves up during a first portion of the step and down during a second portion of the step. Similarly, the forward speed of the person increases during a first portion of the step and decreases during a second portion when the foot reaches the ground. As such, throughout a series of steps, lateral right/left (also referred to as "sideways") acceleration components generally cycle with a two-step period while transverse forward/backward and vertical up/down acceleration components cycle with a one-step period.

The motion direction estimation module 666 (or in some other implementations, the step detection module 662) can leverage the information about the relationship between steps and corresponding periodic components of lateral right/left, transverse forward/backward, and vertical up/down (for example, Right, COG, and Up in an RCU coordinate system) acceleration components to isolate the COG component of the motion vector M, which can then be transformed to a global coordinate system. In some implementations, to isolate the COG component of motion from the lateral, transverse and vertical components associated with the periodic biomechanics of human motion, the motion direction estimation module 666 stores and analyzes the acceleration data received from the sensor suite 134 in, for example, the memory 132, over a number of consecutive steps (for example, 2, 4, 6, 8, 10 or more consecutive steps). For example, because periodic lateral accelerations associated with human steps approximately have a two-step period, the motion direction estimation module 666 can substantially or approximately cancel out the lateral acceleration components of the person's motion by summing the acceleration components (for example, the acceleration components obtained by the accelerometers 236) with one-step-shifted versions of themselves. Similarly, because periodic forward/backward and vertical accelerations associated with human steps approximately have a one-step period, the motion direction estimation module 666 can substantially or approximately cancel out the forward/backward and vertical acceleration components of the person's motion by summing the acceleration components (for example, the acceleration components obtained by the accelerometers 236) with half-step-shifted versions of themselves.

Additionally, in many use cases, the mobile device 100 is not carried or otherwise positioned at or near a central location of the carrying user's body during motion. Additionally, in many use cases, the mobile device 100 may shift orientation or otherwise move relative to the user's body during motion. In some such use cases, there may be asymmetric or non-periodic lateral, transverse or vertical acceleration components not associated with steps or with true course-over-ground motion. The motion direction estimation module 666 can further suppress or cancel these asymmetric acceleration components by leveraging the relationship between the transverse forward/backward acceleration and the vertical acceleration components. For example, when the forward/backward and vertical acceleration components are viewed as time-varying periodic signals (where the period is equivalent to one step), a correlation can generally be observed between them. More particularly, it has been observed that the vertical acceleration signal and the forward/backward signal are offset in phase by a characteristic amount that may be empirically determined. For example, when a typical person is walking, the vertical acceleration and forward/backward acceleration components are offset by approximately one-quarter of one step (or "90 degrees"). In some implementations, in such a use case, the motion direction estimation module 666 can substantially or approximately cancel out the asymmetric components of the acceleration by leveraging the known or expected correlation (for example, the phase offset) between the forward/backward and vertical acceleration components.

However, the phase offset between the vertical acceleration and forward/backward acceleration components can change based on where and how the mobile device 100 is being carried during motion; that is, based on a particular use case. For example, the phase offset or other parameters or characteristics of motion can change based on whether the mobile device 100 is being carried in a hand swinging forward and backward as the person walks, being carried out in front (for example, while the user is viewing the display 104 or otherwise interacting with the mobile device), being held at the person's ear while the person is using the mobile device 100 as a telephone, or being carried in the person's pocket, purse, or pack. Each of these scenarios also may be considered a particular use case. The phase offset or other parameters or characteristics may also change based on a change in speed, gait or cadence (for example, from walking to jogging to running) Each of these scenarios also may be considered a particular use case.

In some implementations, the motion direction estimation module 666 identifies a use case based on an observed correlation of the acceleration components over a number of steps (for example, 2, 4, 6, 8, 10 or more steps) or, in some other implementation, over some duration of time. In some such implementations, after a use case is identified, the motion direction estimation module 666 then adjusts the phase offset or other parameters (for example, a window of time or number of steps within which to track and correlate acceleration data) to more accurately estimate the motion vector M.

In some implementations, after the orientation O is determined and the unwanted acceleration components (for example, those associated with periodic human step biomechanics and those associated with asymmetric motion not otherwise associated with true COG motion) are canceled or substantially reduced as, for example, described above, the motion direction estimation module 666 then analyzes the orientation O and the remaining acceleration components to estimate, calculate or otherwise determine and output the motion vector M. For example, in some implementations, the motion direction estimation module 666 performs an eigenvector analysis, and particularly, an eigen-decomposition on the remaining acceleration components.

For example, an eigen-decomposition can be used to determine two horizontal (for example, relative to the surface of the Earth) eigenvectors $e_1$ and $e_2$, each of which corresponds to an orthogonal directional axis along which COG motion occurs. In some implementations, the motion direction estimation module 666 selects the directional axis corresponding to the horizontal eigenvector having the larger respective eigenvalue as the dominant axis of motion (e.g., a forward-backward or COG direction). In some situations or applications, there may be some ambiguity in the resolved dominant axis of motion. For example, while it may be clear from the eigen-decomposition that the pedestrian motion direction is along a particular global coordinate system axis, there may be ambiguity as to which direction along this axis the forward motion is occurring. For example, such ambiguity may result if the presumed phase difference between the vertical and forward motions is inaccurate and does not distinguish the forward and backward directions correctly.

In some implementations, the motion direction estimation module 666 further refines the motion vector M based on other sensor data such as that measured from the gyroscopes 240 and magnetometers 242.

In some implementations, a reliability metric computation module 672 calculates a reliability metric the for estimated motion vector M. The reliability metric indicates a measure of certainty in the estimated motion vector M. The reliability metric can be calculated based on one or more techniques. In some implementations, a first reliability metric $R_1$ can be based on a process used to estimate the motion vector M itself. For example, as described above, the motion direction estimation module 666 may perform an eigen-decomposition to determine two horizontal eigenvectors $e_1$ and $e_2$, each of which corresponds to an orthogonal directional axis along which motion occurs. As described above, the directional axis corresponding to the horizontal eigenvector having the larger respective eigenvalue can be selected as the dominant axis of motion (for example, a forward-backward direction). A ratio of this larger eigenvalue (for example, that corresponding to $e_1$) to the smaller eigenvalue (for example, that corresponding to $e_2$) can provide a first reliability metric $R_1$; that is, a measure of certainty that the direction of motion is along the first eigenvector $e_1$.

Additionally or alternatively, in some implementations, the reliability metric computation module 672 calculates a second reliability metric $R_2$ by analyzing the estimated motion vector signal M over a number of steps or over a period of time. For example, if the direction of the estimated motion vector M remains relatively constant or consistent over the period, then a second reliability metric $R_2$ can be generated that indicates certainty in the current estimated motion vector M. Contrarily, if the estimated motion direction M is widely varying or inconsistent over the period, then the second reliability metric $R_2$ can indicate uncertainty or unreliability in the current estimated motion vector M. Various intermediate values also are possible; that is, the value of the second reliability metric $R_2$ can be proportional to the consistency of the estimated motion vector M over a number of steps or a duration of time.

Additionally or alternatively, in some implementations, the reliability metric computation module 672 performs various calculations to quantify a device stability as a third reliability metric $R_3$. For example, the device stability can reflect changes in the orientation direction O over time as measured by one or more of the accelerometers 236, gyroscopes 240 or magnetometers 242. In this way, a value of the third reliability metric $R_3$ can be determined that is proportional to the stability of the mobile device 100 over a number of steps or a duration of time, and in some such implementations, more directly the stability of the orientation O over a number of steps or a duration of time.

In some implementations, the determination of the stability of the orientation O includes determining a horizontal component of an instantaneous acceleration, as for example, determined by the motion direction estimation module 666 from acceleration data obtained by the accelerometers 236. Additionally, the determination of the stability of the orientation O also can include determining a vertical component of an instantaneous acceleration, as for example, determined by the motion direction estimation module 666 from acceleration data obtained by the accelerometers 236. In some implementations, the determination of the stability of the orientation O also includes smoothing one or both of the horizontal component and the vertical component of the instantaneous acceleration. For example, the smoothing can include or involve applying a moving average filter to the instantaneous acceleration data over a number of steps or a duration of time. In some implementations, the determination of the stability of the orientation O also includes determining a rate of change of the norm of the difference of the smoothed horizontal component from one sample to the next sample (for example, from one step to the next). Similarly, the determination of the stability of the orientation O also can include determining a rate of change of the norm of the difference of the smoothed vertical component from one sample to the next sample (for example, from one step to the next). In some implementations, the determination of the stability of the orientation O further includes comparing the rate of change of the smoothed horizontal component of the instantaneous acceleration to one or more horizontal threshold values to obtain a horizontal reliability value. Similarly, the rate of change of the smoothed vertical component of the instantaneous acceleration also can be compared to one or more vertical threshold values to obtain a vertical reliability value. The horizontal and vertical reliability values can then be summed or otherwise combined to determine the third reliability metric $R_3$. For example, if the horizontal acceleration component is above a first horizontal reliability threshold then the third reliability metric $R_3$ can include a first horizontal reliability value, if the horizontal acceleration component is above a second horizontal reliability threshold then the third reliability metric $R_3$ can include a second horizontal reliability value, and so on. Similarly, if the vertical acceleration component is above a first vertical reliability threshold then the third reliability metric $R_3$ can include a first vertical reliability value, if the vertical acceleration component is above a second vertical reliability threshold then the third reliability metric $R_3$ can include a second vertical reliability value, and so on.

Additionally or alternatively, determining a stability of the mobile device also can include determining a rate of rotation, or a change in a rate of rotation, of the mobile device around one or more axes of rotation. For example, as described above, the gyroscopes 240 can measure such rotation data around the axes of the mobile device coordinate system 300 or another coordinate system. In some such implementations, determining the device stability further includes smoothing the one or more determined rates of rotation (or changes in rates of rotation) over a number of steps or a duration of time (for example, by a moving average filter). In some implementations, the determination of the stability of the orientation O further includes comparing the respective smoothed rates of rotation or changes in rates of rotation to one or more respective threshold values to obtain respective axis-of-rotation reliability values. The reliability values for each of the axes of rotation can then be summed or otherwise combined to determine the third reliability metric $R_3$.

In some implementations, one or more reliability metrics, such as the reliability metrics $R_1$, $R_2$ and $R_3$ described above, are combined by the reliability metric computation module 672 to calculate or generate a combined (also referred to herein as an "overall" or "composite") reliability metric $R_T$ for the estimated motion vector M. In some implementations, the reliability metric computation module 672 sums two or more of the reliability metrics $R_1$, $R_2$ and $R_3$ described above. In some implementations, the reliability metric computation module 672 multiplies each of one or more of the reliability metrics $R_1$, $R_2$ and $R_3$ by respective weights $W_1$, $W_2$ and $W_3$ prior to summation or other combination. In some implementations, the weights $W_1$, $W_2$ and $W_3$ are previously determined (for example, empirically) constants. In some other implementations, the reliability metric computation module 672 calculates the weights $W_1$, $W_2$ and $W_3$ as functions of various parameters.

Figure 7:
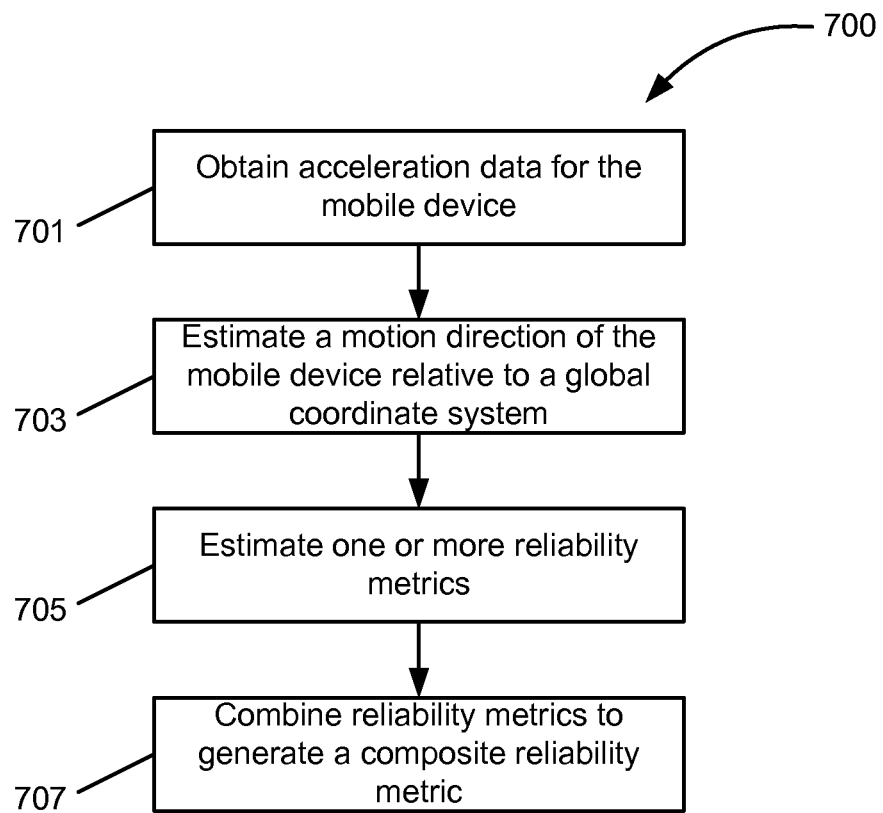
FIG. 7 is a flow diagram illustrating an example process for calculating a reliability metric for determining a measure of reliability in an estimated motion vector M.

FIG. 7 is a flow diagram illustrating an example process 700 for calculating a reliability metric for determining a measure of reliability in an estimated motion vector M. In some implementations, the process 700 begins at 701 with obtaining acceleration data for a mobile device (for example, the mobile device 100) in each of one or more directions. For example, in some implementations, the first linear accelerometer 236A can measure linear acceleration data along the first axis 338A of the mobile device coordinate system 300 of FIG. 3, the second linear accelerometer 236B can measure linear acceleration data along the second orthogonal axis 338B and the third linear accelerometer 236C can measure linear acceleration data along the third orthogonal axis 338C. In some implementations, the acceleration data also can include angular acceleration data from, for example, the gyroscopes 240.

In some implementations, the process 700 proceeds at 703 with estimating a motion direction of the mobile device relative to a global coordinate system based at least in part on the acceleration data obtained at 701. For example, as described above with reference to FIG. 6, the motion direction estimation module 666 can analyze the orientation O and the remaining acceleration components after cancelling the periodic and asymmetric components to estimate, calculate or otherwise determine and output the motion vector M. Again, the motion vector M can be generated in any suitable coordinate system such as, for example, the ECEF coordinate system 400 or the ENU coordinate system 301 described above.

In some implementations, after a motion vector M is estimated, the process 700 proceeds at 705 with estimating one or more reliability metrics. Each reliability metric indicates a measure of certainty or estimated accuracy in the estimated motion vector M. In some such implementations, at least two reliability metrics are determined. For example, as described above with reference to FIG. 6, the reliability metric computation module 672 can calculate a first reliability metric $R_1$ based on a process used to estimate the motion vector M itself. For example, the motion direction estimation module 666 can perform an eigen-decomposition to determine two horizontal eigenvectors $e_1$ and $e_2$, each of which corresponds to an orthogonal directional axis along which motion occurs. And as described above, the directional axis corresponding to the horizontal eigenvector having the larger respective eigenvalue can be selected as the dominant axis of motion (for example, a forward-backward direction). The first reliability metric $R_1$ can be, or can be based on, the ratio of this larger eigenvalue (for example, that corresponding to $e_1$) to the smaller eigenvalue (for example, that corresponding to $e_2$); that is, the first reliability metric $R_1$ indicates a measure of certainty that the direction of motion is along the first eigenvector $e_1$.

Also as described above with reference to FIG. 6, the reliability metric computation module 672 can calculate a second reliability metric $R_2$ based on a consistency of the estimated motion vector signal M over a number of steps or over a period of time. For example, if the direction of the estimated motion vector M remains relatively constant or consistent over the period, then a second reliability metric $R_2$ can be generated that indicates certainty in the current estimated motion vector M. Contrarily, if the estimated motion direction M is widely varying or inconsistent over the period, then the second reliability metric $R_2$ can indicate uncertainty or unreliability in the current estimated motion vector M. As described above, various intermediate values also are possible such that the value of the second reliability metric $R_2$ can be proportional to the consistency of the estimated motion vector M over a number of steps or a duration of time.

As described above, the reliability metric computation module 672 also can, in some implementations, perform various calculations to calculate a third reliability metric $R_3$ based on a quantification of the stability of the device. For example, the device stability can reflect changes in the orientation direction O over time as measured by one or more of the accelerometers 236, gyroscopes 240 or magnetometers 242. In this way, a value of the third reliability metric $R_3$ can be proportional to the stability of the mobile device 100 over a number of steps or a duration of time, and in some such implementations, more directly the stability of the orientation O over a number of steps or a duration of time.

In some implementations, after the one or more reliability metrics are determined at 705, the process 700 proceeds at 707 with summing or otherwise combining the one or more reliability metrics, such as the reliability metrics $R_1$, $R_2$ and $R_3$ described above, to calculate or generate a composite reliability metric $R_T$ for the estimated motion vector M. For example, in some implementations, the reliability metric computation module 672 sums two or more of the reliability metrics $R_1$, $R_2$ and $R_3$ described above. Additionally, in some implementations, the reliability metric computation module 672 multiplies each of one or more of the reliability metrics $R_1$, $R_2$ and $R_3$ by respective weights $W_1$, $W_2$ and $W_3$ prior to summation or other combination. In some implementations, the motion direction M estimated at 703 is only used when the composite reliability metric $R_T$ determined at 707 is above a threshold. In some such implementations, when the composite reliability metric $R_T$ is not above a threshold, then the mobile device turns on or otherwise enables the network interface 114 so that calibration data can be received from, for example, a GPS or other SNS system to refine the motion vector M and to reduce the uncertainty.

In some implementations, the process 700 is performed (or "repeated") on a step-by-step basis. In some other implementations, the process 700 is performed periodically, for example, every 2, 4, 6, 8, 10 or more steps, or at other suitable intervals including intervals of time. As described above, in some implementations, the motion direction estimation module 666 and the reliability metric computation module 672 utilize present or past acceleration data, present or past orientation data, present or past rotation data, or previously estimated values of the motion vector M. For example, one or more of the blocks or steps of the process 700 can be performed using data within a moving window of time. For example, one or more of the blocks or steps of the process 700 can be performed on a step-by-step basis using data from the most recent 6 steps or another suitable number of steps or interval of time.

As described above, in some implementations or instances, while it may be clear from the analysis (for example, eigen-decomposition) that the motion vector M is along a particular global coordinate system axis, there may exist ambiguity as to which direction along the axis the motion vector M points. In some implementations, the motion direction estimation module 666 tracks or stores the eigenvalue data signal (for example, $e_1$) corresponding to the eigenvalue associated with the eigenvector determined to be associated with the forward-backward axis of motion. In some such implementations, the motion direction estimation module 666 fits the data recorded for a number of steps (for example, 2, 4, 6, 8, 10, 50, 100 or more steps) to a bimodal probability distribution. In other words, because the eigen-decomposition results in a relatively certain determination that the motion direction M is along a particular axis, but because the values of the eigenvalue $e_1$ over time indicate that the direction of motion could be along either direction (for example, the positive or negative direction) of the axis of motion, the motion direction estimation module 666 allows the eigenvalue data to fit a bimodal distribution knowing that either the positive or negative direction is the true direction. This is in contrast to some conventional methods that may fit of force the data to a normal distribution and take the average of all the samples of the eigenvalue $e_1$ as the direction of motion.

Figure 8:
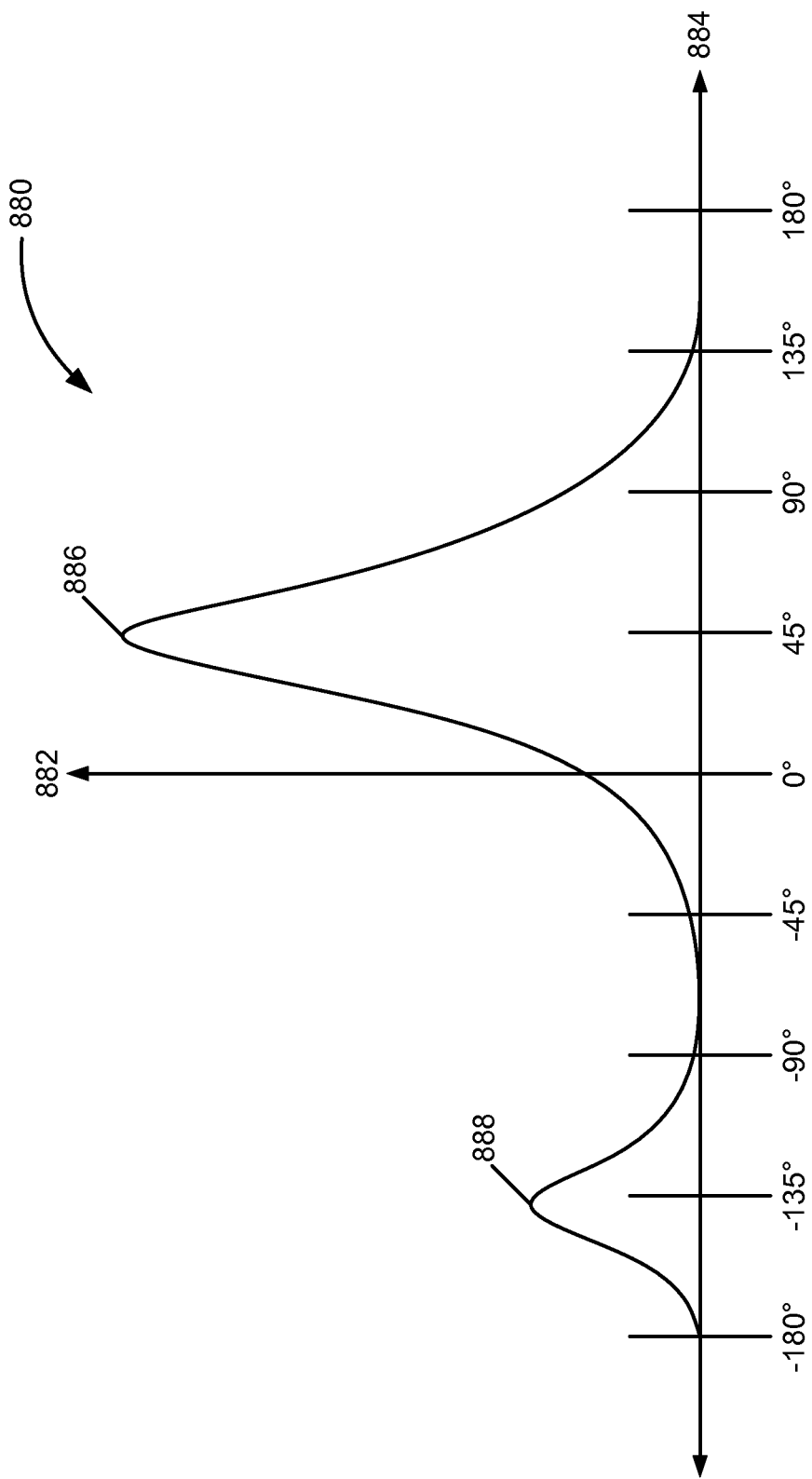
FIG. 8 shows an example bimodal probability distribution.

For example, FIG. 8 shows an example bimodal probability distribution 880. The vertical axis 882 represents the number or density of eigenvalues and the horizontal axis 884 represents the direction in degrees as measured from magnetic North. A first higher peak (or "mode") 886 of the bimodal probability distribution 880 corresponds to a forward direction along the first horizontal directional axis associated with the first eigenvector $e_1$, and a second lower peak (or "mode") 888 of the bimodal probability distribution 880 corresponds to a backwards direction (opposite the forwards direction) along the first horizontal directional axis associated with the first eigenvector $e_1$. For example, in the example bimodal probability distribution 880, the first peak 886 corresponds to a forward direction that is 45 degrees East of magnetic North and the second peak 888 corresponds to a backwards direction that is 180 degrees from the forward direction; that is, 135 degrees West (or −135 degrees East) of magnetic North. In this example, the motion direction estimation module 666 would select 45 degrees from magnetic North as the direction of motion M. Contrarily, if the mean of the data was used as the direction of motion as in some conventional devices, then, continuing the example, the direction of motion may be determined to be −10 degrees from North—clearly not an accurate estimation—resulting from forcing the data to a normal distribution or single-peaked model.

In some such implementations, the motion direction estimation module 666 compares the relative heights of the first peak 886 and the second peak 888 and selects the direction corresponding to the highest one of the peaks (in this case the forward direction corresponding to the first peak 886) as the direction of the motion vector M. In some implementations, the reliability metric computation module 672 calculates a reliability metric $R_4$ based on a ratio of the height of the first peak 886 to the height of the second peak 888. For example, a larger ratio may indicate a more reliable estimation of the motion direction M. Additionally or alternatively, in some implementations, the reliability metric computation module 672 analyzes the widths of the first peak 886 and the second peak 888 to estimate a reliability metric $R_5$ for the selected direction of the motion vector M. For example, wider peaks may indicate a less reliable estimation of the motion direction M while narrower peaks (representative of more consistent data) indicate a more reliable estimation of the motion direction M. In some implementations, one or both of the reliability metrics $R_4$ and $R_5$ can be combined with one or more of the reliability metrics $R_1$, $R_2$ and $R_3$ described above to generate the composite reliability metric $R_T$.

Figure 9:
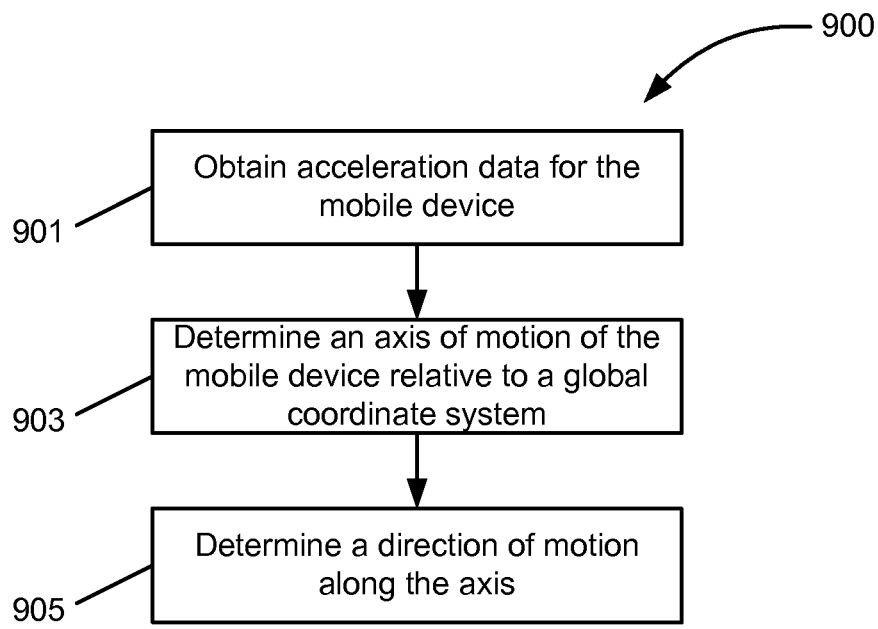
FIG. 9 is a flow diagram illustrating an example process for determining a direction of motion M.

FIG. 9 is a flow diagram illustrating an example process 900 for determining a direction of motion M. In some implementations, the process 900 begins at 901 with obtaining acceleration data for a mobile device (for example, the mobile device 100) in each of one or more directions. For example, in some implementations, the first linear accelerometer 236A can measure linear acceleration data along the first axis 338A of the mobile device coordinate system 300 of FIG. 3, the second linear accelerometer 236B can measure linear acceleration data along the second orthogonal axis 338B and the third linear accelerometer 236C can measure linear acceleration data along the third orthogonal axis 338C. In some implementations, the acceleration data also can include angular acceleration data from, for example, the gyroscopes 240.

In some implementations, the process 900 proceeds at 903 with determining an axis of motion of the mobile device relative to a global coordinate system based at least in part on the acceleration data obtained at 901. For example, as described above with reference to FIG. 6, the motion direction estimation module 666 can analyze the orientation O and the remaining acceleration components after cancelling the periodic and asymmetric components to estimate, calculate or otherwise determine the primary or dominant axis of motion. For example, an eigen-decomposition can be used to determine two horizontal (for example, relative to the surface of the Earth) eigenvectors $e_1$ and $e_2$, each of which corresponds to an orthogonal directional axis along which COG motion occurs. In some implementations, the motion direction estimation module 666 selects the directional axis corresponding to the horizontal eigenvector having the larger respective eigenvalue (for example, $e_1$) as the dominant axis of motion (e.g., a forward-backward direction).

In some implementations, the process 900 proceeds at 905 with determining a direction of motion along the axis of motion determined at 903. For example, in some implementations, the motion direction estimation module 666 tracks or stores the eigenvalue data signal (for example, $e_1$) over a number of steps or a duration of time. In some such implementations, the motion direction estimation module 666 fits the eigenvalue data recorded for a number of steps (for example, 2, 4, 6, 8, 10, 50, 100 or more steps) to a bimodal probability distribution, such as, for example, the bimodal probability distribution 880 of FIG. 8. As described above, a first higher peak 886 of the bimodal probability distribution 880 can correspond to a forward direction along the first horizontal directional axis associated with the first eigenvector $e_1$, and a second lower peak 888 of the bimodal probability distribution 880 can correspond to a backwards direction (opposite the forwards direction) along the first horizontal directional axis associated with the first eigenvector $e_1$. In some such implementations, the motion direction estimation module 666 compares the relative heights of the first peak 886 and the second peak 888 and selects the direction corresponding to the highest one of the peaks as the direction of the motion M.

In some implementations, the process 900 is performed on a step-by-step basis. In some other implementations, the process 900 is performed periodically, for example, every 2, 4, 6, 8, 10 or more steps, or at other suitable intervals including intervals of time. As described above, in some implementations, the motion direction estimation module 666 and the reliability metric computation module 672 utilize present or past acceleration data, present or past orientation data, present or past rotation data, or previously estimated values of the motion vector M. For example, one or more of the blocks or steps of the process 900 can be performed using data within a moving window of time. For example, one or more of the blocks or steps of the process 900 can be performed on a step-by-step basis using data from the most recent 6 steps or another suitable number of steps or interval of time.

In some implementations, the motion direction estimation module 666 identifies a likely use case; that is, a likely manner in which the mobile device is being carried by the pedestrian or a manner in which the pedestrian is moving. For example, the motion direction estimation module 666 can use any of the linear acceleration, angular acceleration, or other rotation or orientation data to determine a likely use case. As described above, some example pedestrian use cases include walking, jogging, running or stair climbing. For example, linear acceleration data obtained by the linear accelerometers 236 may be used to determine that a user is running versus walking. A determined phase offset between the vertical and horizontal components of acceleration also can be used to determine whether a user is, for example, running versus walking. Some use cases also may reflect where or how the mobile device 100 is positioned or being carried during motion. For example, such use cases reflect whether the mobile device 100 is being carried in a hand swinging forward and backward as the person walks, being carried out in front (for example, while the user is viewing the display 104 or otherwise interacting with the mobile device), being held at the person's ear while the person is using the mobile device 100 as a telephone, or being carried in the person's pocket, purse, or pack. Use cases also can be determined based on a combination of the aforementioned use cases. For example, a use case in which a person is jogging while talking with the mobile device at her ear. As described above, the motion direction estimation module 666 also can use non-movement related information to classify a current use case of the mobile device or person. For example, based on a certain tilt of the mobile device 100 (as determined from rotation data or magnetic data from the gyroscopes 240 or magnetometers 242, respectively), or whether a call is initiated, the motion direction estimation module 666 can determine that the mobile device 100 is being held near the person's ear.

Once the use case is identified, the parameters used in the motion direction estimation module 666 can then be selected and optimized to obtain an accurate estimated motion direction M. For example, in some implementations, the motion direction estimation module 666 identifies the use case by matching the acceleration, rotation or orientation data determined from the sensor suite 134 to acceleration, rotation or orientation data corresponding to predetermined use cases stored in a use case database in, for example, the memory 132. In some such implementation, the motion direction estimation module 666 can retrieve a set of predetermined parameters stored or linked with the identified use case in the memory 132. In some other implementations, the motion direction estimation module 666 does not match data with that of predetermined use cases. In such implementations, the motion direction estimation module 666 can determine a use case and subsequently select or otherwise optimize existing parameters for that specific use case. The motion direction estimation module can then use the selected parameters to estimate the motion direction M.

Figure 10:
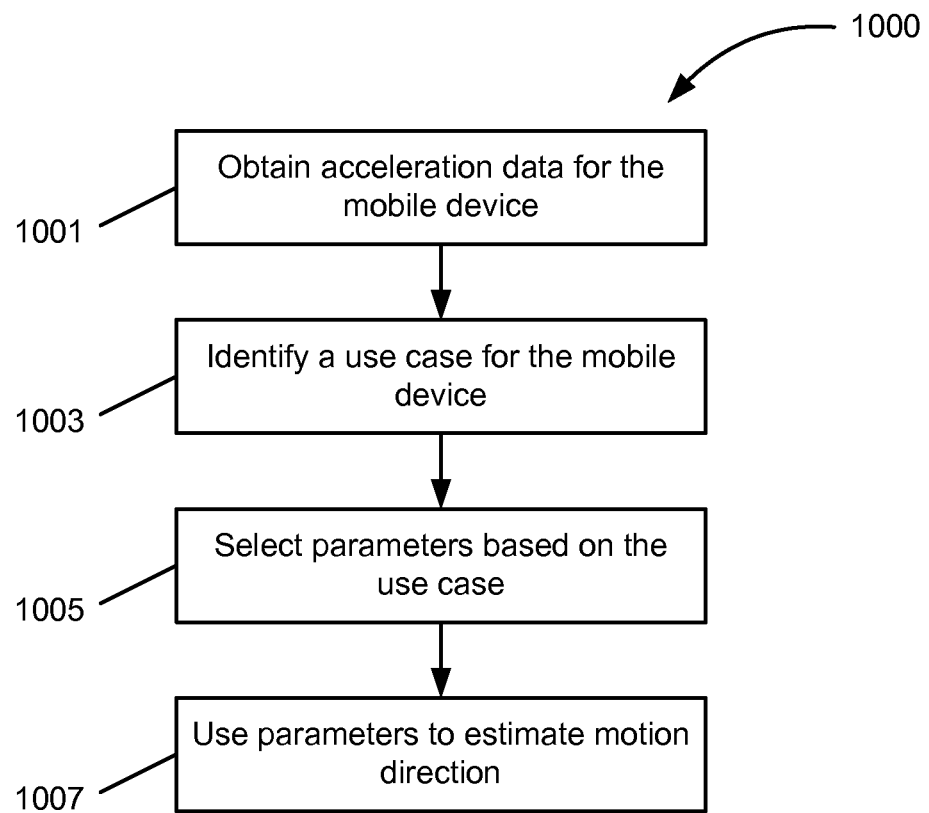
FIG. 10 is a flow diagram illustrating an example process for selecting one or more parameters to determine a direction of motion M.

FIG. 10 is a flow diagram illustrating an example process 1000 for selecting one or more parameters to determine a direction of motion M. In some implementations, the process 1000 begins at 1001 with obtaining acceleration data for a mobile device (for example, the mobile device 100) in each of one or more directions. For example, in some implementations, the first linear accelerometer 236A can measure linear acceleration data along the first axis 338A of the mobile device coordinate system 300 of FIG. 3, the second linear accelerometer 236B can measure linear acceleration data along the second orthogonal axis 338B and the third linear accelerometer 236C can measure linear acceleration data along the third orthogonal axis 338C. In some implementations, the acceleration data also can include angular acceleration data from, for example, the gyroscopes 240.

In some implementations, the process 1000 proceeds at 1003 with identifying a use case for the mobile device based at least in part on the acceleration data. For example, the motion direction estimation module 666 can identify a use case based on the linear acceleration data obtained from linear accelerometers 236. Additionally or alternatively, in some other implementations, the use case also can be determined based on other angular acceleration data, rotation data or orientation data. For example, in some implementations, the motion direction estimation module 666 identifies the use case by matching the acceleration, rotation or orientation data determined from the sensor suite 134 to acceleration, rotation or orientation data corresponding to predetermined use cases stored in a use case database in, for example, the memory 132. In some other implementations, the motion direction estimation module 666 does not match data with that of predetermined use cases; rather, the motion direction estimation module 666 identifies or determines one or more use case characteristics to more precisely determine the actual use case of the user.

In some implementations, the process 1000 then proceeds at 1005 with selecting one or optimizing one or more parameters for use by the motion direction estimation module 666 is estimating a motion direction M. In some implementations in which the motion direction estimation module 666 matches acceleration data with that of predetermined use cases stored in memory, the motion direction estimation module 666 can retrieve a set of predetermined parameters stored or linked with the identified use case in the memory 132. In some other implementations in which the motion direction estimation module 666 does not perform such a matching, the motion direction estimation module 666 can determine a use case and subsequently select or otherwise optimize existing parameters for that specific use case.

In some implementations, the process then proceeds at 1007 with using the selected parameters to estimate the motion direction M relative to a global coordinate system as, for example, described above. For example, the estimation of the motion direction of the mobile device can be based at least in part on the acceleration data obtained at 1001 and one or more of the averaging window size, smoothing mechanism, and the presumed phase offset between the forward and vertical acceleration signals. Furthermore the device may selectively choose to turn on and make use of gyroscope measurements for high-motion use cases. For example, as described above with reference to FIG. 6, after selecting the appropriate parameters based on the predetermined use case, the motion direction estimation module 666 can analyze the orientation O and the remaining acceleration components after cancelling the periodic and asymmetric components to estimate, calculate or otherwise determine and output the motion vector M. Again, the motion vector M can be generated in any suitable coordinate system such as, for example, the ECEF coordinate system 400 or the ENU coordinate system 301 described above.

In some implementations, the process 1000 is performed on a step-by-step basis. In some other implementations, the process 1000 is performed periodically, for example, every 2, 4, 6, 8, 10 or more steps, or at other suitable intervals including intervals of time. As described above, in some implementations, the motion direction estimation module 666 and the reliability metric computation module 672 utilize present or past acceleration data, present or past orientation data, present or past rotation data, or previously estimated values of the motion vector M. For example, one or more of the blocks or steps of the process 1000 can be performed using data within a moving window of time. For example, one or more of the blocks or steps of the process 1000 can be performed on a step-by-step basis using data from the most recent 6 steps or another suitable number of steps or interval of time.

Figure 11:
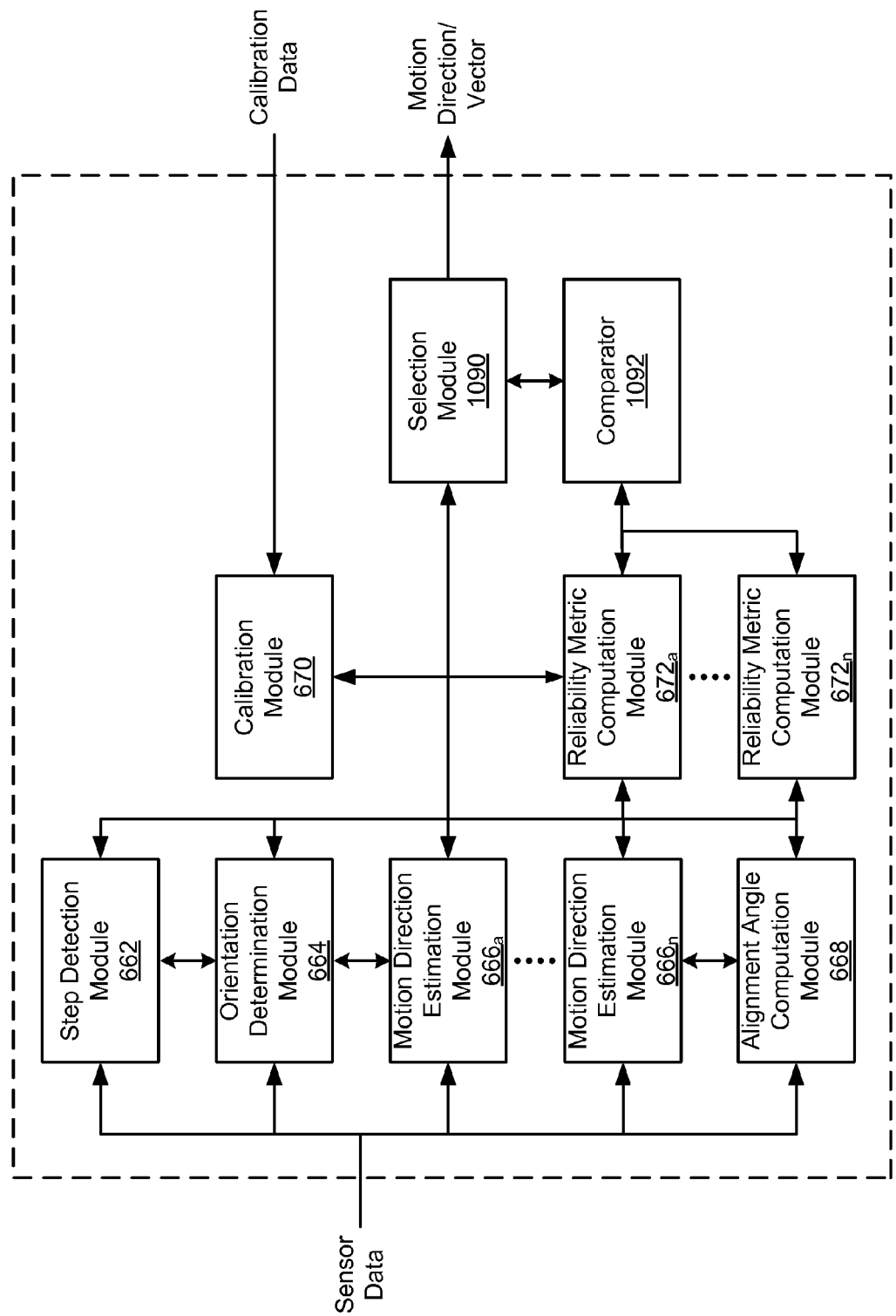
FIG. 11 shows another block diagram of example modules that can be stored in a memory and implemented in conjunction with a processor to perform one or more of the methods or processes described.

FIG. 11 shows another block diagram of example modules that can be stored in the memory 132 and implemented in conjunction with the processor 120 to perform one or more of the methods or processes described. In some implementations, the example modules of FIG. 11 are the same or similar to those described with reference to FIG. 6 with an exception being that the memory 132 stores a plurality of motion direction estimation modules $666_a$-$666_n$ that, when executed by the processor 120, perform in parallel to generate a respective plurality of estimated motion directions $M_a$-$M_n$. For example, the memory 132 may include 2, 3, 4, 5 or more parallel-running motion direction estimation modules $666_a$-$666_n$. For example, each of the motion direction estimation modules $666_a$-$666_n$ can use a different set of one or more parameters based on a predefined respective use case. For example, a first motion direction estimation module $666_a$ can be set to use or select a set of parameters optimized for a use case in which the mobile device is in the person's hand and being viewed by the person (for example, held at chest level in front of the person). A second motion direction estimation module $666_b$ can be set to use or select a second different set of parameters optimized for a use case in which the mobile device is in the person's hand and swinging along with the person's arm as the person walks or runs. A third motion direction estimation module $666_c$ can be set to use or select a third different set of parameters optimized for a use case in which the mobile device is in the person's hand and held to the person's ear for communicating. And a fourth motion direction estimation module $666_d$ can be set to use or select a fourth different set of parameters optimized for a use case in which the mobile device is in the person's pocket or handbag. In some implementations, the parameters that can be used or tuned can include, for example, the length of an averaging window, a smoothing mechanism, a phase difference used to identify correlations between horizontal and vertical acceleration components, or whether to always average across a pair of consecutive steps in an attempt to cancel effects of left-foot/right-foot asymmetry. In this way, rather than detecting a use case and subsequently configuring parameters, a plurality of motion direction estimations modules can run in parallel, where each motion direction estimation module is configured with a different set of parameters for a particular corresponding use case.

In some implementations, the memory 132 also stores a plurality of reliability metric computation module $672_a$-$672_n$ that, when executed by the processor 120, perform in parallel to generate a plurality of reliability metrics $R_a$-$R_n$ for the respective estimated motion directions $M_a$-$M_n$ generated by the respective motion direction estimation modules $666_a$-$666_n$. In some implementations, a selection module 1190 selects the one of the estimated motion directions $M_a$-$M_n$ having the highest respective one of the reliability metrics $R_a$-$R_n$ as the estimated motion direction M of the person. In other words, the one of the motion directions $M_a$-$M_n$ having the highest respective one of the reliability metrics $R_a$-$R_n$ is selected because the use case associated with the one of the motion direction estimation modules $666_a$-$666_n$ that produced the selected motion direction likely matches, or at least is the best match for, the actual use case of the person carrying the mobile device.

In some implementations, the memory 132 also can store a comparator 1192 that, when executed by the processor 120, performs to compare each of the reliability metrics $R_a$-$R_n$ to a threshold, or in some other implementations, performs to compare the selected one of the reliability metrics $R_a$-$R_n$ to the threshold. In some implementations, if none of the reliability metrics $R_a$-$R_n$ are above a threshold, then the comparator 1192 sends a signal to the selection module 1090 to instruct the selection module to select the one of the motion directions $M_a$-$M_n$ corresponding to the motion direction selected for the previous step (or other previous analysis point). In some other implementations, if none of the reliability metrics $R_a$-$R_n$ are above a threshold, then the comparator 1192 sends a signal to the selection module 1190 to instruct the selection module to select the one of the motion directions $M_a$-$M_n$ estimated by a motion direction estimation module that uses a default set of parameters. In still other implementations, the selection module 1190 can select two or more of the most reliable estimated motion directions $M_a$-$M_n$ and average or otherwise combine them, and in some implementations with different weights, to obtain a single composite estimated motion direction M.

Figure 12:
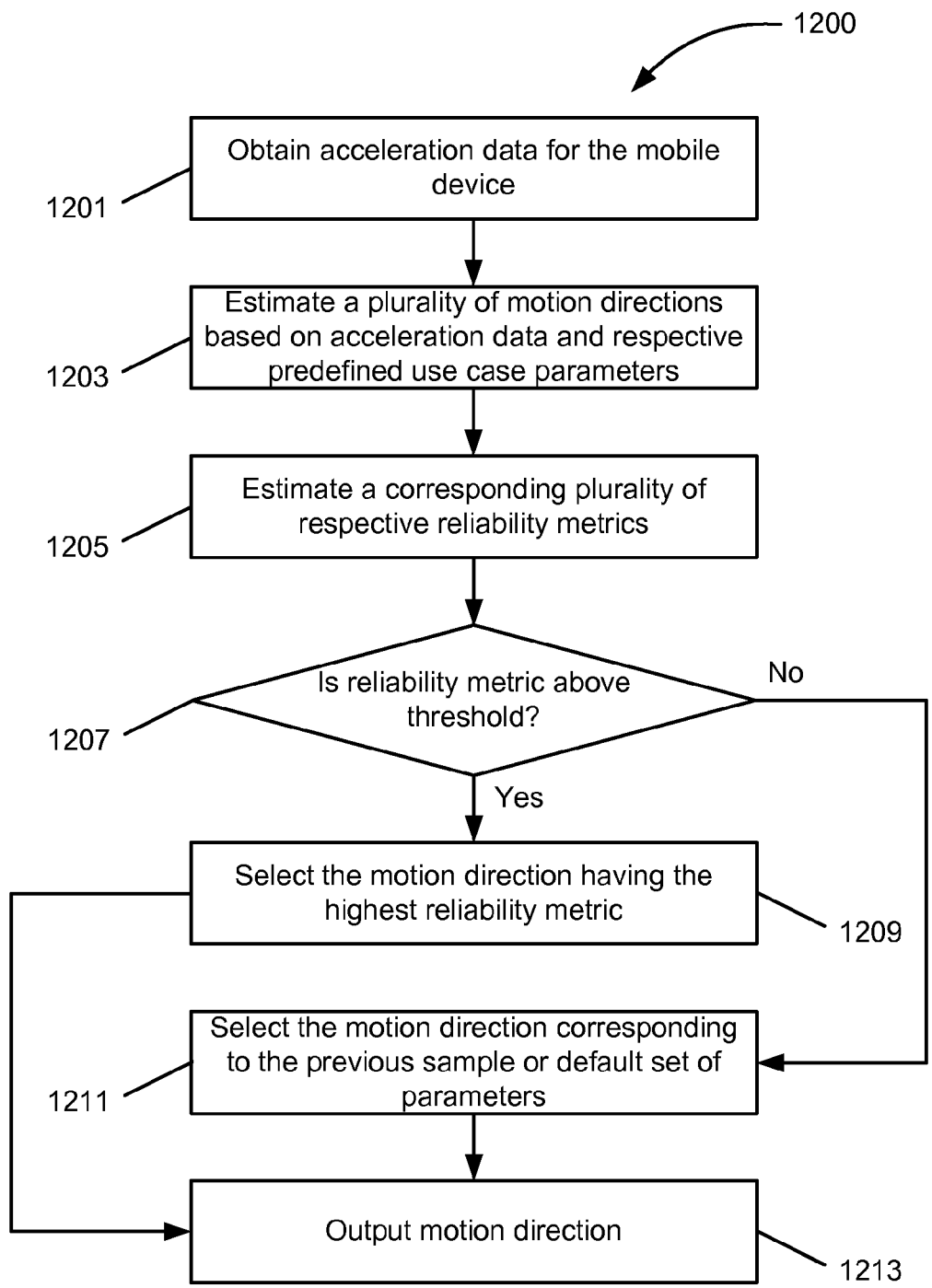
FIG. 12 is a flow diagram illustrating an example process for determining a direction of motion M.

FIG. 12 is a flow diagram illustrating an example process 1200 for determining a direction of motion M. In some implementations, the process 1200 begins at 1201 with obtaining acceleration data for a mobile device (for example, the mobile device 100) in each of one or more directions. For example, in some implementations, the first linear accelerometer 236A can measure linear acceleration data along the first axis 338A of the mobile device coordinate system 300 of FIG. 3, the second linear accelerometer 236B can measure linear acceleration data along the second orthogonal axis 338B and the third linear accelerometer 236C can measure linear acceleration data along the third orthogonal axis 338C. In some implementations, the acceleration data also can include angular acceleration data from, for example, the gyroscopes 240.

In some implementations, the process 1200 proceeds at 1203 with estimating a plurality of motion directions $M_a$-$M_n$ for the mobile device based at least in part on the acceleration data obtained at 1201. For example, the motion direction estimation modules $666_a$-$666_n$ can estimate the plurality of motion directions $M_a$-$M_n$. As described above, each of the motion direction estimation modules $666_1$-$666_n$ can use a different set of one or more parameters based on a predefined respective use case. Also, as described above with reference to FIG. 6, each of the motion direction estimation modules $666_a$-$666_n$ can analyze the orientation O and the remaining acceleration components after cancelling the periodic and asymmetric components to estimate, calculate or otherwise determine and output the motion directions $M_a$-$M_n$. Again, the motion directions $M_1$-$M_n$ can be generated in any suitable coordinate system such as, for example, the ECEF coordinate system 400 or the ENU coordinate system 301 described above.

In some implementations, after the motion directions $M_1$-$M_n$ are estimated at 1203, the process 1200 proceeds at 1205 with estimating a corresponding plurality of respective reliability metrics $R_a$-$R_n$. Each of the reliability metrics $R_a$-$R_n$ indicates a measure of certainty or estimated accuracy in the respective one of the estimated motion directions $M_1$-$M_n$. In some implementations, each of the reliability metrics $R_a$-$R_n$ is itself a combination or composite reliability metric. For example, as described above, each of the reliability metrics $R_a$-$R_n$ can be a combination of some or all of the reliability metrics $R_1$, $R_2$, $R_3$, $R_4$ and $R_5$.

In some implementations, the process 1200 proceeds at 1207 comparing the highest respective one of the reliability metrics $R_a$-$R_n$ to a threshold and determining whether the reliability metric is above the threshold. When the highest one of the reliability metrics $R_a$-$R_n$ is above the threshold, then the process 1200 proceeds at 1209 with selecting (for example, by the selection module 1190) the respective one of the estimated motion directions $M_a$-$M_n$ having the highest one of the reliability metrics $R_a$-$R_n$ as the estimated motion direction M of the person. The respective one of the motion directions $M_a$-$M_n$ is then output at 1213. In some implementations, if it is determined at 1207 that the highest one of the reliability metrics $R_a$-$R_n$ is not above the threshold, then the one of the motion directions $M_a$-$M_n$ corresponding to the motion direction selected for the previous step (or other previous sample or analysis point) is selected at 1211 and output at 1213. In some other implementations, if it is determined at 1207 that the highest one of the reliability metrics $R_a$-$R_n$ is not above the threshold, then the one of the motion directions $M_a$-$M_n$ estimated by a respective one of the motion direction estimation modules $666_a$-$666_n$ that uses a default set of parameters is selected at 1211 and output at 1213. As described above, the selection module 1190 also can select two or more of the most reliable estimated motion directions $M_a$-$M_n$ and average or otherwise combine them, and in some implementations with different weights, to obtain a single composite estimated motion direction M.

In some implementations, the process 1200 is performed on a step-by-step basis. In some other implementations, the process 1200 is performed periodically, for example, every 2, 4, 6, 8, 10 or more steps, or at other suitable intervals including intervals of time. As described above, in some implementations, the motion direction estimation modules $666_a$-$666_n$ and the reliability metric computation module $672_a$-$672_n$ utilize present or past acceleration data, present or past orientation data, present or past rotation data, or previously estimated values of the motion directions $M_a$-$M_n$. For example, one or more of the blocks or steps of the process 1200 can be performed using data within a moving window of time. For example, one or more of the blocks or steps of the process 1200 can be performed on a step-by-step basis using data from the most recent 6 steps or another suitable number of steps or interval of time.

The various illustrative logics, logical blocks, modules, circuits and algorithm steps described in connection with the implementations disclosed herein can be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein can be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, or, any conventional processor, controller, microcontroller, or state machine. A processor also can be implemented as a combination of computing devices, such as a combination of a DSP and a microprocessor, a plurality of microprocessors, one or more microprocessors in conjunction with a DSP core, or any other such configuration. In some implementations, particular steps and methods can be performed by circuitry that is specific to a given function.

In one or more aspects, the functions described can be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions can be stored on or transmitted over as one or more instructions or code on a computer-readable medium. The steps of a method or algorithm disclosed herein can be implemented in a processor-executable software module which can reside on a computer-readable medium. Computer-readable media includes both computer storage media and communication media including any medium that can be enabled to transfer a computer program from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above also can be included within the scope of computer-readable media. Additionally, the operations of a method or algorithm can reside as one or any combination or set of codes and instructions on a machine readable medium and computer-readable medium, which can be incorporated into a computer program product.

Various modifications to the implementations described in this disclosure can be readily apparent to those skilled in the art, and the generic principles defined herein can be applied to other implementations without departing from the spirit or scope of this disclosure. Thus, the claims are not intended to be limited to the implementations shown herein, but are to be accorded the widest scope consistent with this disclosure, the principles and the novel features disclosed herein. As used herein, a phrase referring to "at least one of" a list of items refers to any combination of those items, including single members. As an example, "at least one of: a, b, or c" is intended to cover: a, b, c, a-b, a-c, b-c, and a-b-c. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of, e.g., an IMOD display element as implemented. Additionally, the conjunction "or" is intended in the inclusive sense where appropriate unless otherwise indicated; that is, the phrase "A or B" is intended to include the possibilities of "A," "B," and "A and B."

Certain features that are described in this specification in the context of separate implementations also can be implemented in combination in a single implementation. Conversely, various features that are described in the context of a single implementation also can be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, a person having ordinary skill in the art will readily recognize that such operations need not be performed in the particular order shown or in sequential order, or that all illustrated operations be performed, to achieve desirable results. Further, the drawings can schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method comprising:
   obtaining acceleration data for a mobile device in each of one or more directions;
   determining a primary axis of motion of the mobile device based at least in part on the acceleration data;
   determining an estimated motion direction of the mobile device along the primary axis of motion, the determining including:
   fitting the acceleration data, or data derived therefrom, to a bimodal distribution, wherein a first peak of the bimodal distribution corresponds to a first motion direction along the primary axis of motion, and wherein a second peak of the bimodal distribution corresponds to a second motion direction along the primary axis of motion opposite the first motion direction; and determining the estimated motion direction of the mobile device relative to a coordinate system based at least in part on the bimodal distribution;

determining a reliability metric for the estimated motion direction; and controlling a network interface of the mobile device such that the network interface is turned off or otherwise disabled if the reliability metric is above a threshold value, the network interface being configured to communicate with a Global Positioning System, Satellite Navigation System, or other positioning or navigation system.

2. The method of claim 1, wherein determining the motion direction of the mobile device relative to the coordinate system based at least in part on the bimodal distribution includes selecting the one of the first and second motion directions corresponding to the higher of the first and second peaks as the estimated motion direction of the mobile device.

3. The method of claim 1, further including comparing a first height of the first peak with a second height of the second peak and determining a reliability metric for the estimated motion direction based on a ratio of the first and second heights.

4. The method of claim 1, further including analyzing a width of at least the higher of the first and second peaks and determining a reliability metric for the estimated motion direction based on the width.

5. The method of claim 1, further including identifying an orientation of the mobile device relative to the coordinate system based on the acceleration data or other orientation data, wherein estimating the motion direction of the mobile device relative to the coordinate system also is based at least in part on the orientation.

6. The method of claim 5, wherein the orientation data includes one or both of gyroscopic data and magnetometer data.

7. The method of claim 1, further including tracking a number of steps taken by a person carrying the mobile device or to which the mobile device is attached.

8. The method of claim 1, wherein obtaining acceleration data for the mobile device includes:

measuring a first linear acceleration of the mobile device along a first directional axis in a mobile device coordinate system;

measuring a second linear acceleration of the mobile device along a second directional axis in the mobile device coordinate system; and measuring a third linear acceleration of the mobile device along a third directional axis in the mobile device coordinate system.

9. The method of claim 8, further including transforming the first, second and third linear accelerations in the mobile device coordinate system into first, second and third linear accelerations in a global coordinate system, wherein:

the global coordinate system is the coordinate system;

the first linear acceleration in the global coordinate system is a first horizontal acceleration;

the second linear acceleration in the global coordinate system is a second horizontal acceleration; and the third linear acceleration in the global coordinate system is a vertical acceleration.

10. The method of claim 9, wherein determining a primary axis of motion of the mobile device based at least in part on the acceleration data includes performing an eigendecomposition on at least the first and second horizontal accelerations to identify at least a first eigenvalue and a second eigenvalue, the first eigenvalue corresponding to a first horizontal eigenvector and the second eigenvalue corresponding to a second horizontal eigenvector.

11. The method of claim 10, wherein the first peak of the bimodal distribution corresponds to positive values of the first eigenvalue and the second peak of the bimodal distribution corresponds to negative values of the first eigenvalue.

12. A mobile device comprising: one or more sensors configured to measure acceleration data for the mobile device in each of one or more directions;

one or more processors; and a memory storing instructions that, when executed by the one or more processors, implement a motion direction estimation module configured to: determine a primary axis of motion of the mobile device based at least in part on the acceleration data;

determine an estimated motion direction of the mobile device along the primary axis of motion, the determination including:

fitting the acceleration data, or data derived therefrom, to a bimodal distribution, wherein a first peak of the bimodal distribution corresponds to a first motion direction along the primary axis of motion, and wherein a second peak of the bimodal distribution corresponds to a second motion direction along the primary axis of motion opposite the first motion direction; and determining the estimated motion direction of the mobile device relative to a coordinate system based at least in part on the bimodal distribution;

determine a reliability metric for the estimated motion direction; and control a network interface of the mobile device such that the network interface is turned off or otherwise disabled if the reliability metric is above a threshold value, the network interface being configured to communicate with a Global Positioning System, Satellite Navigation System, or other positioning or navigation system.

13. The mobile device of claim 12, wherein to determine the motion direction of the mobile device relative to the coordinate system based at least in part on the bimodal distribution, the motion direction estimation module is configured to select the one of the first and second motion directions corresponding to the higher of the first and second peaks as the estimated motion direction of the mobile device.

14. The mobile device of claim 12, wherein the memory further stores instructions that, when executed by the one or more processors, implement a reliability metric computation module configured to compare a first height of the first peak with a second height of the second peak and to determine a reliability metric for the estimated motion direction based on a ratio of the first and second heights.

15. The mobile device of claim 12, wherein the memory further stores instructions that, when executed by the one or more processors, implement a reliability metric computation module configured to analyze a width of at least the higher of the first and second peaks and to determine a reliability metric for the estimated motion direction based on the width.

16. The mobile device of claim 12, wherein the memory further stores instructions that, when executed by the one or more processors, implement an orientation determination module configured to identify an orientation of the mobile device relative to the coordinate system based on the acceleration data or other orientation data, wherein the motion direction estimation module also is configured to estimate the motion direction of the mobile device based at least in part on the orientation.

17. The mobile device of claim 16, wherein the one or more sensors include one or more gyroscopes or one or more magnetometers, and wherein the orientation data includes one or both of gyroscopic data and magnetometer data.

18. The mobile device of claim 12, wherein the memory further stores instructions that, when executed by the one or more processors, implement a step detection module configured to track a number of steps taken by a person carrying the mobile device or to which the mobile device is attached.

19. The mobile device of claim 12, wherein:
the one or more sensors include:
   a first linear accelerometer configured to measure a first linear acceleration of the mobile device along a first directional axis in a mobile device coordinate system;
   a second linear accelerometer configured to measure a second linear acceleration of the mobile device along a second directional axis in the mobile device coordinate system; and
   a third linear accelerometer configured to measure a third linear acceleration of the mobile device along a third directional axis in the mobile device coordinate system; and
the motion direction estimation module is further configured to transform the first, second and third linear accelerations in the mobile device coordinate system into first, second and third linear accelerations in a global coordinate system, wherein:
   the global coordinate system is the coordinate system;
   the first linear acceleration in the global coordinate system is a first horizontal acceleration;
   the second linear acceleration in the global coordinate system is a second horizontal acceleration; and
   the third linear acceleration in the global coordinate system is a vertical acceleration.

20. The mobile device of claim 19, wherein to estimate the primary axis of motion of the mobile device relative to the coordinate system, the motion direction estimation module is configured to perform an eigendecomposition on at least the first and second horizontal accelerations to identify at least a first eigenvalue and a second eigenvalue, the first eigenvalue corresponding to a first horizontal eigenvector and the second eigenvalue corresponding to a second horizontal eigenvector.

21. The mobile device of claim 20, wherein the first peak of the bimodal distribution corresponds to positive values of the first eigenvalue and the second peak of the bimodal distribution corresponds to negative values of the first eigenvalue.

22. One or more non-transitory computer-readable storage media including instructions that, when executed by one or more processors, are configured to:
receive acceleration data for a mobile device in each of one or more directions;
determine a primary axis of motion of the mobile device based at least in part on the acceleration data;
determine an estimated motion direction of the mobile device along the primary axis of motion, the determination including:
   fitting the acceleration data, or data derived therefrom, to a bimodal distribution, wherein a first peak of the bimodal distribution corresponds to a first motion direction along the primary axis of motion, and wherein a second peak of the bimodal distribution corresponds to a second motion direction along the primary axis of motion opposite the first motion direction; and
   determining the estimated motion direction of the mobile device relative to a coordinate system based at least in part on the bimodal distribution;
determine a reliability metric for the estimated motion direction; and
control a network interface of the mobile device such that the network interface is turned off or otherwise disabled if the reliability metric is above a threshold value, the network interface being configured to communicate with a Global Positioning System, Satellite Navigation System, or other positioning or navigation system.

23. The one or more non-transitory media of claim 22, wherein the instructions for determining the motion direction include instructions for selecting the one of the first and second motion directions corresponding to the higher of the first and second peaks as the estimated motion direction of the mobile device.

24. The one or more non-transitory media of claim 22, further including instructions for comparing a first height of the first peak with a second height of the second peak and for determining a reliability metric for the estimated motion direction based on a ratio of the first and second heights.

25. The one or more non-transitory media of claim 22, further including instructions for analyzing a width of at least the higher of the first and second peaks and for determining a reliability metric for the estimated motion direction based on the width.

26. The one or more non-transitory media of claim 22, further including instructions for identifying an orientation of the mobile device relative to the coordinate system based on the acceleration data or other orientation data, wherein the estimated motion direction of the mobile device is based at least in part on the orientation.

27. The one or more non-transitory media of claim 22, further including instructions for tracking a number of steps taken by a person carrying the mobile device or to which the mobile device is attached.

28. The one or more non-transitory media of claim 22, wherein the instructions for estimating the primary axis of motion of the mobile device include instructions for performing an eigendecomposition on the acceleration data to identify at least a first eigenvalue and a second eigenvalue corresponding to a first horizontal eigenvector and a second horizontal eigenvector.

29. The one or more non-transitory media of claim 28, wherein the first peak of the bimodal distribution corresponds to positive values of the first eigenvalue and the second peak of the bimodal distribution corresponds to negative values of the first eigenvalue.

\* \* \* \* \*